(12) United States Patent
Reid et al.

(10) Patent No.: US 12,259,606 B2
(45) Date of Patent: Mar. 25, 2025

(54) METHOD FOR FABRICATING A LIQUID-CRYSTAL-BASED ELECTRO-OPTICAL LIGHT MODULATOR USING SURFACE MEMS TECHNIQUES FOR FLAT PANEL DISPLAY INSPECTION

(71) Applicant: Orbotech Ltd., Yavne (IL)

(72) Inventors: Jason S. Reid, San Jose, CA (US); Karla Gutierrez Cuevas, San Jose, CA (US)

(73) Assignee: Orbotech Ltd., Yavne (IL)

( * ) Notice: Subject to any disclaimer, the term of this patent is extended or adjusted under 35 U.S.C. 154(b) by 13 days.

(21) Appl. No.: 18/244,087

(22) Filed: Sep. 8, 2023

(65) Prior Publication Data
US 2024/0085728 A1   Mar. 14, 2024

Related U.S. Application Data

(60) Provisional application No. 63/406,712, filed on Sep. 14, 2022.

(51) Int. Cl.
| | | |
|---|---|---|
| *G02F 1/03* | (2006.01) | |
| *G01N 21/17* | (2006.01) | |
| *G02B 5/08* | (2006.01) | |
| *G02F 1/1337* | (2006.01) | |

(52) U.S. Cl.
CPC ....... *G02F 1/0311* (2013.01); *G01N 21/1717* (2013.01); *G02B 5/0833* (2013.01); *G02F 1/133711* (2013.01); *G01N 2021/1721* (2013.01); *G02F 2201/38* (2013.01); *G02F 2202/022* (2013.01)

(58) Field of Classification Search
CPC .......... G01N 2021/172; G01N 21/1717; G02F 1/0311; G02F 1/0316; G02F 1/025; G02F 1/133711; G02F 1/133723; G02F 1/133769; G02B 5/0841; G02B 5/0833
See application file for complete search history.

(56) References Cited

U.S. PATENT DOCUMENTS

| | | | |
|---|---|---|---|
| 5,406,213 | A | 4/1995 | Henley |
| 5,432,461 | A | 7/1995 | Henley |
| 5,465,052 | A | 11/1995 | Henley |
| 5,615,039 | A | 3/1997 | Henley |
| 6,151,153 | A | 11/2000 | Bryan |
| 6,933,013 | B2 | 8/2005 | Pethe et al. |
| 7,099,067 | B2 | 8/2006 | Chen |
| 7,639,319 | B2 | 12/2009 | Chen |
| 7,817,333 | B2 | 10/2010 | Chen |
| 8,801,964 | B2 | 8/2014 | Chen |
| 2015/0261024 | A1 | 9/2015 | Chung et al. |

OTHER PUBLICATIONS

Israel Patent Office, International Search Report and Written Opinion received in International Application No. PCT/IL2023/050990, Dec. 19, 2023, 10 pages.

*Primary Examiner* — Christopher Stanford
*Assistant Examiner* — Journey F Sumlar
(74) *Attorney, Agent, or Firm* — Suiter Swantz IP

(57) ABSTRACT

An electro-optic modulator is a liquid-crystal-based electro-optical light modulator. The liquid-crystal-based electro-optical light modulator is fabricated using surface Micro-electromechanical Systems (MEMS) techniques. The electro-optical light modulator is used for inspecting flat panel displays or the like. Utilizing surface MEMS techniques for fabrication considerably thins the electro-optic modulator and allows the use of pure liquid crystal without the need for thick containment plates.

21 Claims, 32 Drawing Sheets

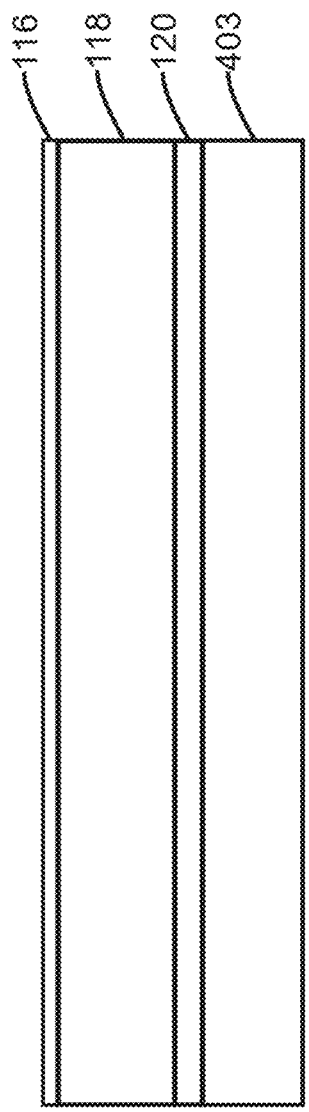

METHOD FOR FABRICATING A LIQUID-CRYSTAL-BASED ELECTRO-OPTICAL LIGHT MODULATOR USING SURFACE MEMS TECHNIQUES FOR FLAT PANEL DISPLAY INSPECTION

CROSS-REFERENCE TO RELATED APPLICATION(S)

The present application claims the benefit under 35 U.S.C. § 119(e) of U.S. Provisional Application Ser. No. 63/406,712, filed Sep. 14, 2022, titled "METHOD FOR FABRICATING A LIQUID-CRYSTAL-BASED ELECTRO-OPTICAL LIGHT MODULATOR USING SURFACE MEMS TECHNIQUES FOR INSPECTION FLAT PANEL DISPLAYS", which is incorporated herein by reference in the entirety.

TECHNICAL FIELD

The present invention generally relates to electro-optics, and more particularly to liquid crystal materials for use in electro-optic applications.

BACKGROUND

Electro-optic modulators using liquid crystals, particularly nematic curvilinear aligned phases (NCAP) films or polymer dispersed liquid crystal (PDLC) films, for modulation are used to test conduction of thin-film transistors and interconnects of flat panel displays (FPD) under fabrication. The electro-optic modulators are fabricated mechanically with thick, stacked subcomponents of glues, NCAP film on Mylar™, pellicle dielectric mirror, and hard coat using mechanical processes.

The electro-optic modulators lends themselves to a high degree of variability and performance compromises leading to increased noise, decreased dynamic range, and lower sensitivity. For example, the NCAP films with 12- or 25-micron thickness will have 20% thickness variation. Therefore, it would be advantageous to provide a device, system, and method that cures the shortcomings described above.

SUMMARY

An electro-optic modulator is described, in accordance with one or more embodiments of the present disclosure. The electro-optic modulator comprises a glass substrate. The electro-optic modulator comprises a transparent electrode disposed on the glass substrate. The electro-optic modulator comprises a first alignment layer disposed on the transparent electrode. The electro-optic modulator comprises a liquid crystal layer disposed on the first alignment layer. The electro-optic modulator comprises a second alignment layer disposed on the liquid crystal layer. The electro-optic modulator comprises a polymer layer disposed on the second alignment layer. The electro-optic modulator comprises a plurality of polymer studs. The plurality of polymer studs extend through at least a portion of the liquid crystal layer. The plurality of polymer studs mechanically support the polymer layer. The electro-optic modulator comprises a dielectric mirror disposed on the polymer layer. The electro-optic modulator comprises a hard coat layer disposed on the dielectric mirror.

In some embodiments, the liquid crystal layer includes a thickness of between 2 and 5 micrometers.

In some embodiments, the liquid crystal layer is not a nematic curvilinear aligned phases or a polymer dispersed liquid crystal.

In some embodiments, the plurality of polymer studs extend from the polymer layer through the second alignment layer and at least the portion of the liquid crystal layer.

In some embodiments, the electro-optic modulator comprises a plurality of alignment studs. The plurality of alignment studs extend from the second alignment layer up to the first alignment layer. The plurality of polymer studs extend through at least the portion of the liquid crystal layer up to the alignment studs. The plurality of polymer studs are disposed on the plurality of alignment studs.

In some embodiments, the electro-optic modulator comprises an anti-reflective coating. The glass substrate is disposed on the anti-reflective coating.

In some embodiments, the plurality of polymer studs extend from the second alignment layer through the liquid crystal layer up to the first alignment layer. The plurality of polymer studs are separated from the polymer layer by the second alignment layer.

In some embodiments, the plurality of polymer studs each include a width of less than 1.4 micrometers and a thickness of between 2 and 5 micrometers.

In some embodiments, the plurality of polymer studs each include a sidewall angle of between 83 and 93 degrees.

In some embodiments, the transparent electrode comprises at least one of indium tin oxide (ITO) or silver nanowire.

In some embodiments, the first alignment layer and the second alignment layer each comprise at least one of silicon oxynitride or silicon dioxide.

In some embodiments, the first alignment layer and the second alignment layer each include a refractive index between 1.51 and 1.55.

In some embodiments, the polymer layer and the plurality of polymer studs each comprise a crosslinked polymer.

In some embodiments, the dielectric mirror has greater than 80% reflectance for light with a wavelength between 570 to 670 nm.

In some embodiments, the dielectric mirror is a stack of repeating layers of silicon nitride and silicon dioxide.

In some embodiments, the dielectric mirror is a stack of repeating layers of zirconium oxide and silicon dioxide.

In some embodiments, the electro-optic modulator comprises an epoxy seal. The epoxy seal seals the liquid crystal layer between the first alignment layer and the second alignment layer.

An imaging system is described, in accordance with one or more embodiments of the present disclosure. The imaging system comprises an illumination source configured to generate illumination. The imaging system comprises a stage for a sample. The imaging system comprises a detector to generate an image of at least a portion of the sample. The imaging system comprises an electro-optic modulator disposed in a path of the illumination from the illumination source and separated from the sample by an air gap. The electro-optic modulator comprises a glass substrate. The electro-optic modulator comprises a transparent electrode disposed on the glass substrate. The electro-optic modulator comprises a first alignment layer disposed on the transparent electrode. The electro-optic modulator comprises a liquid crystal layer disposed on the first alignment layer. The electro-optic modulator comprises a second alignment layer disposed on the liquid crystal layer. The electro-optic modulator comprises a polymer layer disposed on the second alignment layer. The electro-optic modulator comprises a plurality of polymer studs. The plurality of polymer studs extend through at least a portion of the liquid crystal layer. The plurality of polymer studs mechanically support the polymer layer. The electro-optic modulator comprises a dielectric mirror disposed on the polymer layer. The electro-optic modulator comprises a hard coat layer disposed on the dielectric mirror.

An electro-optic modulator is described, in accordance with one or more embodiments of the present disclosure. The electro-optic modulator comprises a glass substrate. The electro-optic modulator comprises a transparent electrode disposed on the glass substrate. The electro-optic modulator comprises a first alignment layer disposed on the transparent electrode. The electro-optic modulator comprises a liquid crystal layer disposed on the first alignment layer. The electro-optic modulator comprises a second alignment layer disposed on the liquid crystal layer. The electro-optic modulator comprises a plurality of alignment studs. The plurality of alignment studs extend from the second alignment layer through the liquid crystal layer up to the first alignment layer. The electro-optic modulator comprises a dielectric mirror disposed on the second alignment layer. The electro-optic modulator comprises a plurality of dielectric studs. The plurality of dielectric studs extend from the dielectric mirror through a first portion of the liquid crystal layer up to the plurality of alignment studs. The plurality of dielectric studs are disposed on the plurality of alignment studs. The electro-optic modulator comprises a polymer layer disposed on the dielectric mirror. The electro-optic modulator comprises a plurality of polymer studs. The plurality of polymer studs extend from the polymer layer through the dielectric mirror, the second alignment layer, and a second portion of the liquid crystal layer up to the plurality of dielectric studs. The plurality of polymer studs are disposed on the plurality of dielectric studs.

In some embodiments, the liquid crystal layer includes a thickness of between 2 and 5 micrometers.

In some embodiments, the liquid crystal layer is not a nematic curvilinear aligned phases or a polymer dispersed liquid crystal.

BRIEF DESCRIPTION OF THE DRAWINGS

The numerous advantages of the disclosure may be better understood by those skilled in the art by reference to the accompanying figures in which:

FIGS. 4C-4M depict a cross-section view of an electro-optic modulator during the method, in accordance with one or more embodiments of the present disclosure.

DETAILED DESCRIPTION OF THE INVENTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are generally directed to electro-optic modulators, methods for fabricating the electro-optic modulators, and imaging systems using the electro-optic modulators. The electro-optic modulators are liquid-crystal-based electro-optical light modulator. The liquid-crystal-based electro-optical light modulator is fabricated using surface Micro-electromechanical Systems (MEMS) techniques. The electro-optical light modulator is used for inspecting flat panel displays or the like. Utilizing surface MEMS techniques for fabrication considerably thins the electro-optic modulator and allows use of pure liquid crystal without the need for thick containment plates.

U.S. Pat. No. 5,432,461, titled "Method of testing active matrix liquid crystal display substrates"; U.S. Pat. No. 7,817,333, titled "Modulator with improved sensitivity and life time", filed on Feb. 6, 2007; U.S. Pat. No. 8,801,964, titled "Encapsulated polymer network liquid crystal material, device and applications", filed on Dec. 22, 2010; U.S. Pat. No. 7,639,319, titled "Polymer dispersed liquid crystal formulations for modulator fabrication", filed on Apr. 7, 2005; U.S. Pat. No. 6,151,153, titled "Modulator transfer process and assembly"; are each incorporated herein by reference in the entirety.

Figure 1A:
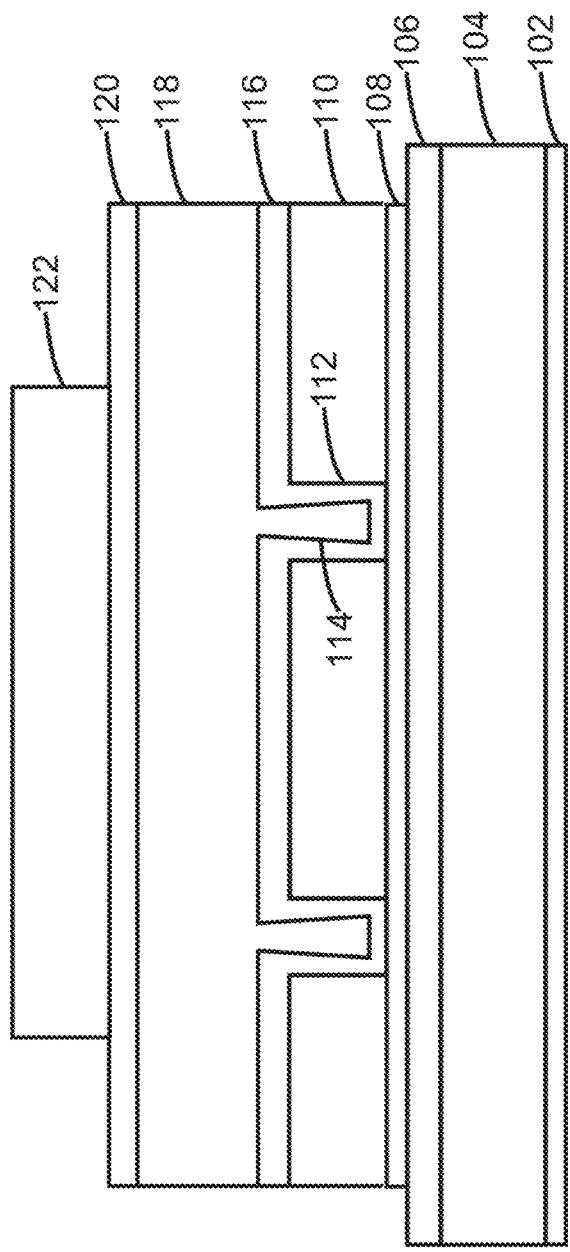
FIG. 1A depicts a cross-section view of an electro-optic modulator, in accordance with one or more embodiments of the present disclosure.
Figure 1B:
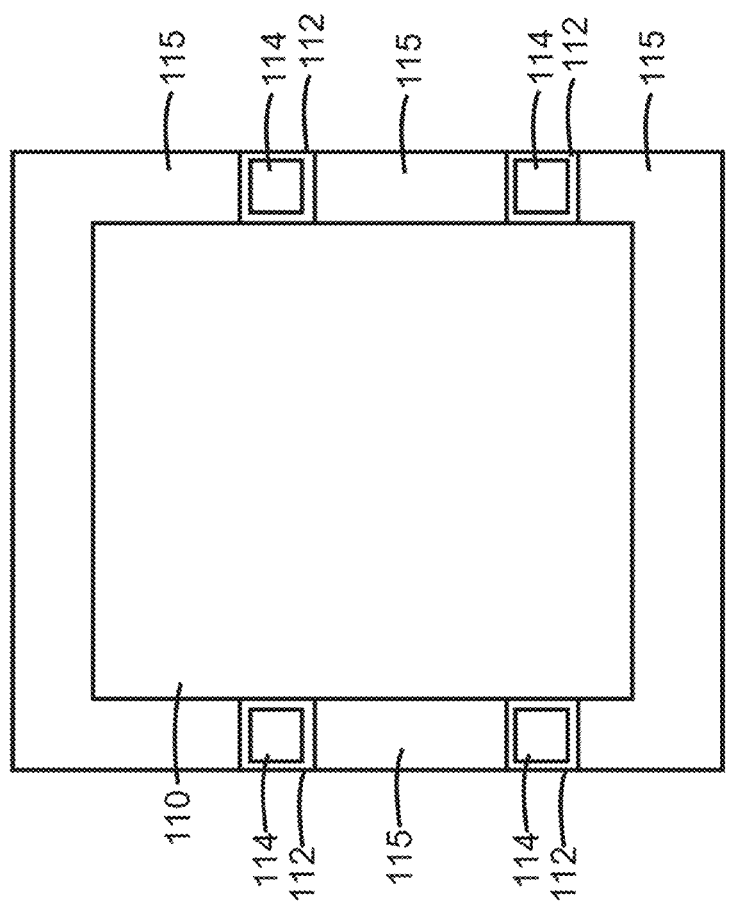
FIG. 1B depicts a top view of a liquid crystal layer, polymer studs, alignment studs, and an epoxy seal of an electro-optic modulator, in accordance with one or more embodiments of the present disclosure.

Referring now to FIG. 1A-1B, an electro-optic (EO) modulator 100 is described, in accordance with one or more embodiments of the present disclosure. The electro-optic modulator 100 may also be referred to as an electro-optical light modulator, a liquid-crystal based electro-optical light modulator, and the like. The electro-optic modulator 100 is a flat-panel display (FPD) Spatial Light modulator (SLM). The electro-optic modulator 100 is a narrow gap device with two dielectric layers separated by polymer studs and an integrated dielectric mirror.

The electro-optic modulator 100 may include one or more films, layers, or coatings. The one or more film layers selectively permit the transmissivity of light. For example, the electro-optic modulator 100 may include one or more layers, such as, but not limited to, anti-reflective coating 102, glass substrate 104, transparent electrode 106, alignment layer 108, liquid crystal layer 110, alignment stud 112, polymer studs 114, epoxy seal 115, alignment layer 116, polymer layer 118, dielectric mirror 120, hard coat layer 122, and the like.

In some embodiments, the electro-optic modulator 100 includes the anti-reflective coating 102. The anti-reflective coating 102 may also be referred to as a dielectric anti-reflective stack of layers.

In some embodiments, the electro-optic modulator 100 includes the glass substrate 104. The glass substrate 104 may include a BK-7 glass, or the like. The glass substrate 104 is disposed on the anti-reflective coating 102.

In some embodiments, the electro-optic modulator 100 includes the transparent electrode 106. The transparent electrode 106 may also be referred to as a transparent conductive layer. The transparent electrode 106 is disposed on the glass substrate 104. The transparent electrode 106 may include any conductive coating that is transparent at the wavelengths of interest. For example, the transparent electrode 106 may include a material, such as, but not limited to, indium tin oxide (ITO), silver nanowires, conductive polythiophene, carbon nanotubes. The material can be applied to the glass substrate via sputtering and masking techniques, or the like. The transparent electrode 106 may include a thickness. For example, the transparent electrode 106 may include a thickness of between 1600 and 1700 Å. In some embodiments, the transparent electrode 106 may include a thickness of between 1600 and 1700 Å with <1.8% variation over the transparent electrode 106. The transparent electrode 106 may capacitively couple with a sample to induce a localized voltage and similarly an electric field. The localized voltage may generate the electric field.

In some embodiments, the electro-optic modulator 100 includes the alignment layer 108. The alignment layer 108 is disposed on the transparent electrode 106. The alignment layer 108 is a dielectric. The alignment layer 108 is disposed between the liquid crystal layer 110 and the transparent electrode 106. By being a dielectric and disposed between the liquid crystal layer 110 and the transparent electrode 106, the alignment layer 108 insulates the liquid crystal layer 110 from the transparent electrode 106. The alignment layer 108 includes a refractive index (n). For example, the alignment layer 108 may include a refractive index of between 1.51 and 1.55. The alignment layer 108 may include any material which is a dielectric and which includes the desired refractive index. In some embodiments, the alignment layer 108 is a silicon oxynitride (SiOxNy). In some embodiments, the alignment layer 108 is a silicon dioxide (SiO$_2$). The alignment layer 108 includes a thickness. For example, the alignment layer 108 may include a thickness of between 230 and 270 Å. An alignment layer may generally refer to a layer which assists in aligning the liquid crystal layer 110. An alignment layer may also be referred to as a photo-responsive layer, as the alignment layer is formed of a photo-responsive material. The photo-responsive material may be photo-patterned to create the alignment layers for the liquid crystal material.

In some embodiments, the alignment layer 108 is etched. The alignment layer 108 is etched with one or more grooves (not depicted). The grooves may also be referred to as continuous nano-trenches, lines, or the like. The grooves may be fabricated by etching, plasma ash, and stripping. In some embodiments, the grooves are etched with a depth. For example, the grooves may be etched with a depth of 200 Å. In some embodiments, the grooves define a checkerboard pattern in the alignment layer 108. The alignment layer 108 includes a line spacing (LS). The line spacing is a distance between the grooves. In some embodiments, the line spacing may be 350 nm or smaller. In some embodiments, the line spacing may be 120 nm or smaller. In some embodiments, the line spacing may be 110 nm or smaller. Although the electro-optic modulator 100 is described as including the alignment layer 108, this is not intended as a limitation of the present disclosure. It is contemplated that the transparent electrode 106 may be etched with one or more grooves.

In some embodiments, the electro-optic modulator 100 includes the liquid crystal layer 110. The liquid crystal layer 110 is disposed on the alignment layer 108. In some embodiments, the liquid crystal layer 110 is vacuum inserted between the alignment layer 108 and the alignment layer 116 or filled by capillary action. In some embodiments, the liquid crystal layer 110 is discontinuous. The alignment studs 112 and the polymer studs 114 extend through the liquid crystal layer 110.

The liquid crystal layer 110 may sense an electric field. The optical properties of the liquid crystal layer 110 change when an electrical field is applied across the liquid crystal. Intensity of light transmitted through the liquid crystal layer 110 is modulated by variations in the electric field strength across the liquid crystal layer 110. Light transmission through the liquid crystal layer 110 may change in accordance with a magnitude of an electric field applied to the liquid crystal layer 110. The electric field causes the liquid crystal layer 110 to align in the direction of the electric field.

In some embodiments, the liquid crystal layer 110 is pure liquid crystal. The pure liquid crystal is a nematic liquid crystal. The liquid crystal layer 110 is homogeneously aligned when an electric field is not present. The liquid crystal layer 110 is homogeneously aligned when an electric field is not present due to the alignment layer 108 and the alignment layer 116. The liquid crystal layer 110 is not a polymer/liquid-crystal composite layer. For example, the liquid crystal layer 110 is not a nematic curvilinear aligned phases (NCAP) or a polymer dispersed liquid crystal (PDLC). In this regard, the liquid crystals in the liquid crystal layer 110 are not encapsulated as droplets in a polymer. The liquid crystal layer 110 includes a thickness. For example, the liquid crystal layer 110 includes a thickness of between 2 and 5 micrometers (um). The liquid crystal layer 110 is significantly thinner than a polymer/liquid-crystal composite NCAP or PDLC material. By utilizing pure liquid crystal rather than NCAP or PDLC, modulator sensitivity and defect-detectability should be significantly enhanced. Thus, the electro-optic modulator 100 provides higher sensitivity and throughput in detecting defects during flat-panel display manufacturing.

In some embodiments, the electro-optic modulator 100 includes the alignment studs 112. The alignment studs 112 are disposed on or below the alignment layer 108. The alignment studs 112 separate the polymer studs 114 and the liquid crystal layer 110. In some embodiments, the alignment studs 112 are used as a form to fabricate the polymer studs 114. The alignment studs 112 extend from the alignment layer 108 up to the alignment layer 116. The alignment studs 112 may include a thickness. For example, the alignment studs 112 may include a thickness of 0.3 um+/−0.012 um. The alignment studs 112 define one or more openings between the alignment studs 112. The liquid crystal layer 110 is added to the electro-optic modulator 100 by the openings. In some embodiments, the openings are sealed by glue. For example, the openings may be sealed by UV curable glue, epoxy or the like.

In some embodiments, the electro-optic modulator 100 includes the polymer studs 114. The polymer studs 114 may include a corrosive-resistant material. The polymer studs 114 are made with photo-responsive polymers that can be cross-linked. For example, the polymer studs 114 may include, but is not limited to polyimide (PI).

The polymer studs 114 mechanically support the polymer layer 118. For example, the polymer studs 114 bear the weight of the polymer layer 118 into the alignment layer 108. In some embodiments, the polymer studs 114 bear the weight of the polymer layer 118 into the alignment layer 108 through the alignment studs 112. The polymer studs 114 extend through at least a portion of the liquid crystal layer 110. In some embodiments, the polymer studs 114 extend from the polymer layer 118. The polymer studs 114 extend from the polymer layer 118 through the alignment layer 116 and at least a portion of the liquid crystal layer 110. In some embodiments, the polymer studs 114 extend through at least a portion of the liquid crystal layer 110 up to the alignment studs 112. In some embodiments, the polymer studs 114 are disposed on the alignment studs 112.

The polymer studs 114 may include a width. The width of the polymer studs 114 may be based on the width of support structures 211 subtracted by twice the thickness of the alignment studs 112 (e.g., for both sides of the polymer studs 114). The polymer studs 114 include a width of less than 1.4 um. In some embodiments, the polymer studs 114 include a width of between 0.776 and 0.824 um. The electro-optic modulator 100 includes a pitch between the polymer studs 114. The pitch defines the distance between a center of one of the studs 114 to a center of an adjacent of the studs 114. In some embodiments, the electro-optic modulator 100 includes a pitch between the polymer studs 114 of between 10 and 20 urn. In some embodiments, the polymer studs 114 include a thickness. For example, the polymer studs 114 may include a thickness of between 2 and 5 urn. In some embodiments, the polymer studs 114 include a sidewall angle. The sidewall angle of the polymer studs 114 may be between 83 and 93 degrees. A sidewall angle of 90 degrees is orthogonal to the alignment layer 108. The polymer studs 114 may be considered to include a re-entrant profile and/or utilize bread-loafing.

In some embodiments, the electro-optic modulator 100 includes the epoxy seal 115. The epoxy seal 115 may also be referred to as a glue seal. The epoxy seal 115 seals the liquid crystal layer 110 between the alignment layer 108 and the alignment layer 116. The epoxy seal 115 is disposed around the edges of the liquid crystal layer 110. The epoxy seal 115 seals the liquid crystal layer 110, preventing egress of the liquid crystal material. The epoxy seal 115 is disposed in openings defined between the polymer studs 114.

In some embodiments, the electro-optic modulator 100 includes the alignment layer 116. The alignment layer 116 is disposed on or below the liquid crystal layer 110. The alignment layer 116 is a dielectric. The alignment layer 116 includes a refractive index (n). For example, the alignment layer 116 may include a refractive index of between 1.51 and 1.55. The alignment layer 116 may include any material which is a dielectric and which includes the desired refractive index. In some embodiments, the alignment layer 116 is a silicon oxynitride (SiOxNy). In some embodiments, the alignment layer 116 is a silicon dioxide ($SiO_2$). The alignment layer 116 includes a thickness. For example, the alignment layer 116 may include a thickness of between 2880 and 3120 Å. By way of another example, the alignment layer 116 may include a thickness of between 285 and 315 Å.

In some embodiments, the electro-optic modulator 100 includes the polymer layer 118. The polymer layer 118 may also be referred to as a polymer layer, a polymer membrane, or the like. The polymer layer 118 is disposed on the alignment layer 116. The alignment layer 108 and the alignment layer 116 are between the polymer layer 118 and the glass substrate 104. The polymer layer 118 may include a corrosive-resistant material. The polymer layer 118 is made with photo-responsive polymers that can be cross-linked. For example, the polymer layer 118 may include, but is not limited to polyimide (PI). The polyimide is high cross-linked to survive a corrosive environment. The polymer layer 118 includes a thickness. For example, the polymer layer 118 includes a thickness of between 4 and 6 um. Thus, the polymer layer 118 and the polymer studs 114 each includes a crosslinked polymer, such as a polyimide.

In some embodiments, the electro-optic modulator 100 includes the dielectric mirror 120. The dielectric mirror 120 may also be referred to as a pellicle dielectric mirror, a quarter-wave mirror, or the like. The dielectric mirror 120 is disposed or coated on the polymer layer 118. In some embodiments, the dielectric mirror 120 is adhered to the polymer layer 118 by carbonyl bonds. The dielectric mirror 120 has reflectance for light with a desired wavelength. For example, the dielectric mirror 120 has greater than 80% reflectance for light with a wavelength between 570 to 670 nm. The dielectric mirror 120 may include a thickness. For example, the dielectric mirror 120 has a thickness of about 1 um. For instance, the dielectric mirror 120 may have a thickness between 0.9 um and 1.1 um.

The dielectric mirror is a multilayer dielectric mirror. The multilayer dielectric mirror includes a first material and a second material. The dielectric mirror 120 may start from a first material layer and end on a second material layer. In this regard, the dielectric mirror 120 may be coated as follows: first material layer, second material layer, . . . first material layer. The dielectric mirror 120 may include any number of the first material layers and the second material layers. For example, the dielectric mirror 120 may include six of the first material layers and five of the second material layers for a total of eleven layers. The first material layers and the second material layers each include a thickness. The thicknesses are dependent on the index of the dielectric mirror 120. In some embodiments, the first material layers have a thickness of 790 Å+1-10%. In some embodiments, the second material layers have a thickness of 1070 Å+1-10%. The first material and second material may include any suitable material. For example, the dielectric mirror may be a silicon nitride ($SiN_x$)/silicon dioxide ($SiO_2$) multilayer dielectric mirror. The silicon nitride may be the first material and the silicon dioxide may be the second material. By way of another example, the dielectric mirror 120 may be a zirconium dioxide ($ZrO_2$)/silicon dioxide ($SiO_2$) multilayer dielectric mirror. The zirconium dioxide may be the first material and the silicon dioxide may be the second material. By way of another example, the dielectric mirror 120 may be Hafnium oxide ($HfO_2$) and the second material may be silicon oxide. In some embodiments, the first material may be any element from group 4B of the periodic table.

In some embodiments, the dielectric mirror 120 includes a pellicle. The pellicle may be disposed adjacent to the polymer layer 118.

In some embodiments, the electro-optic modulator 100 includes the hard coat layer 122. The hard coat layer 122 is disposed on the dielectric mirror 120. The hard coat layer 122 protects the dielectric mirror 120. The hard coat layer 122 is a photo-definable hard coat. In some embodiments, the hard coat layer 122 comprises an organic hard coating. The hard coat layer 122 may comprise components of the hard coat described in U.S. Pat. No. 7,099,067. The hard coat layer 122 includes a thickness. For example, the hard coat layer 122 includes a thickness of between 2.37 and 5 um. The hard coat layer 122 includes a hardness. In some embodiments, the hard coat layer 122 includes a hardness of over 5H pencil hardness. The hard coat layer 122 may include a major hard coating and a thinner slip agent layer.

Figure 2A:
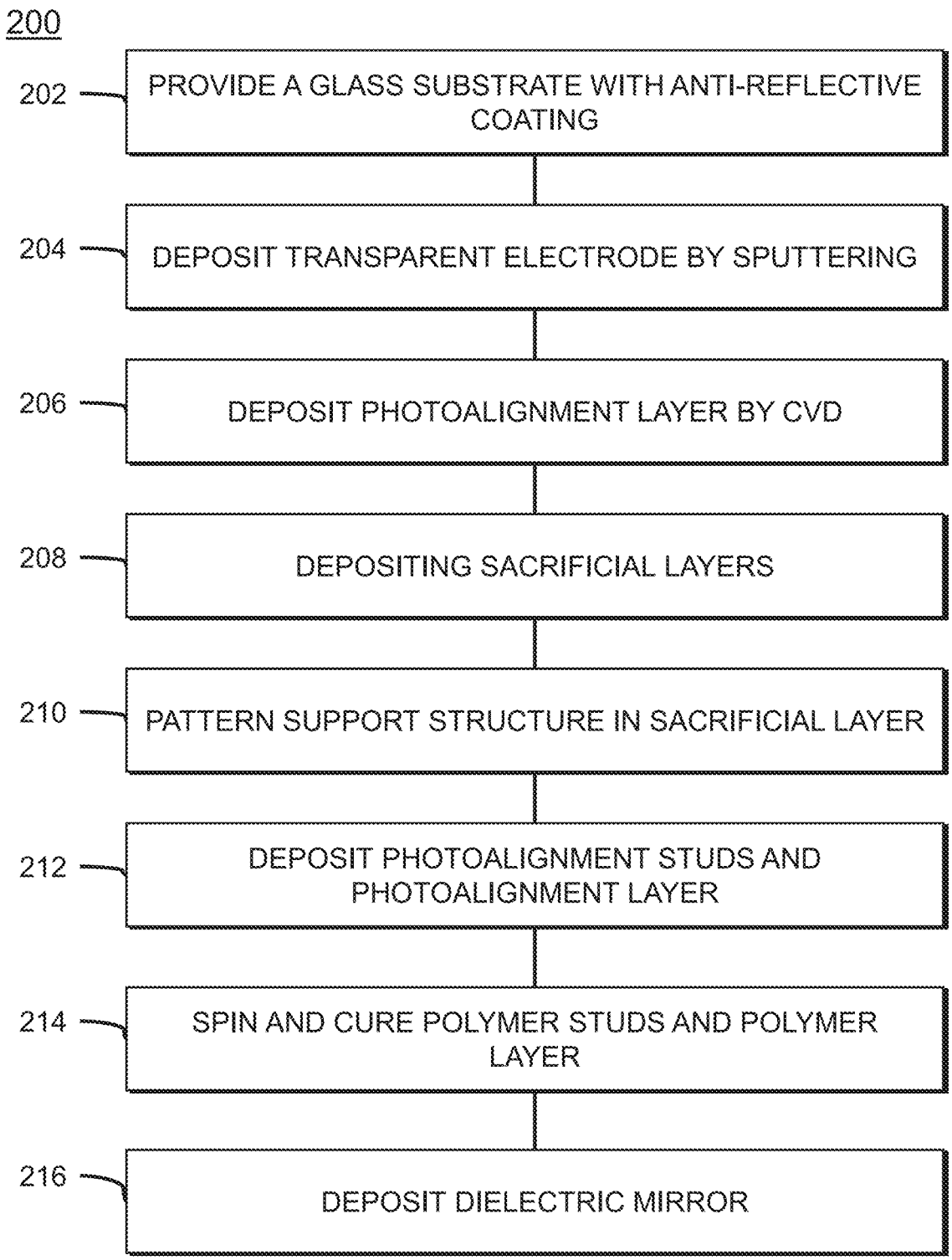
FIGS. 2A-2B depict a flow diagram of a method for making an electro-optic modulator, in accordance with one or more embodiments of the present disclosure.
Figure 2B:
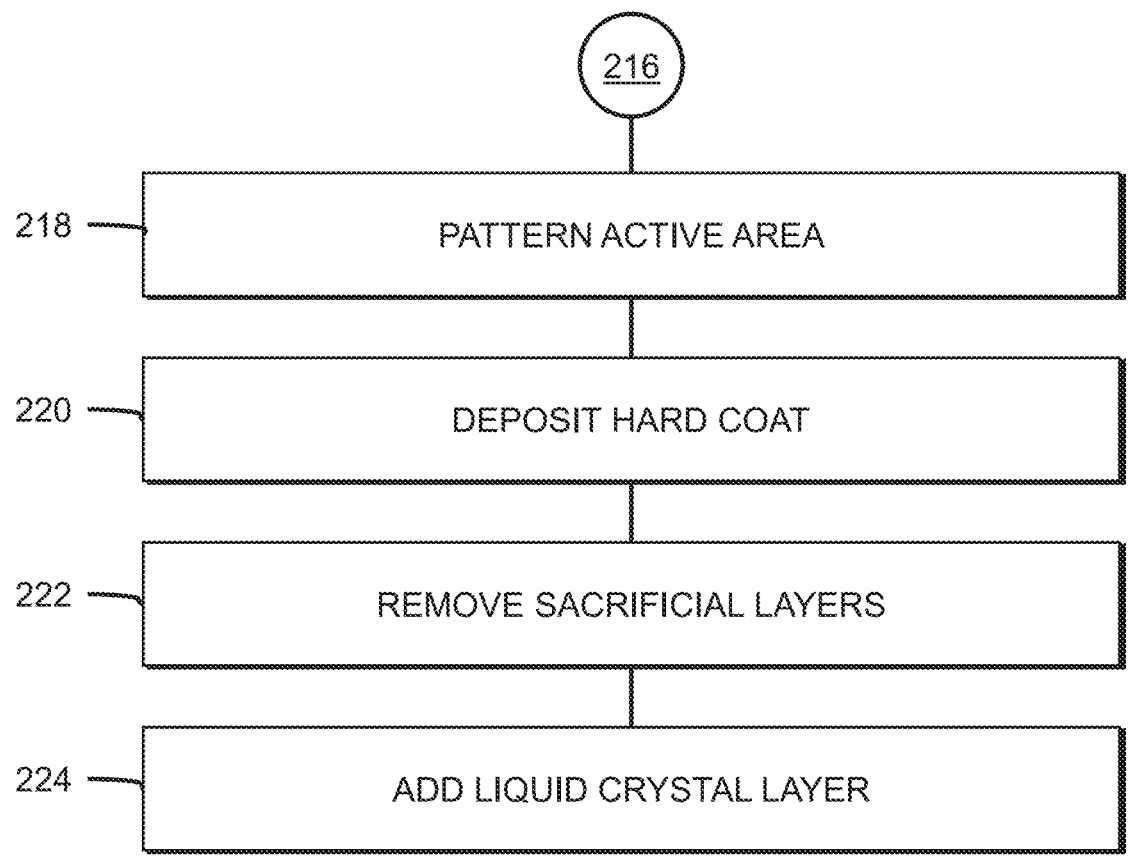
Figure 2C:
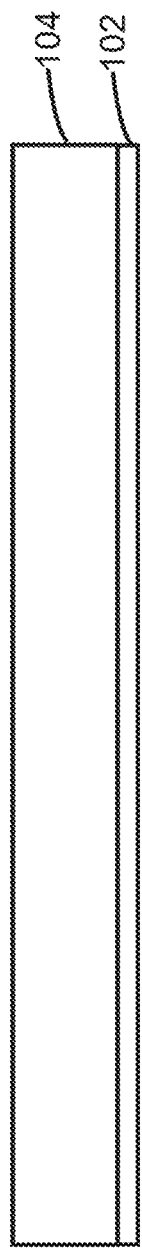
FIGS. 2C-2N depict a cross-section view of an electro-optic modulator during the method, in accordance with one or more embodiments of the present disclosure.
Figure 2D:
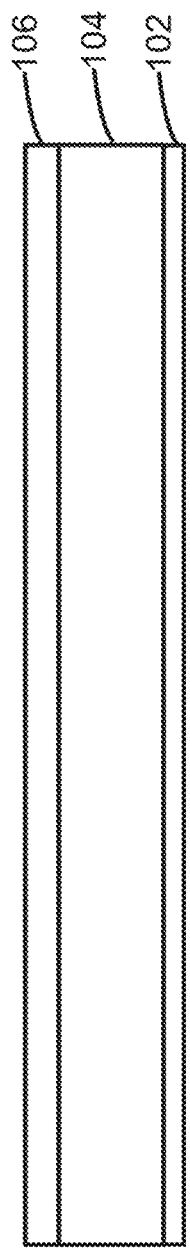
Figure 2E:
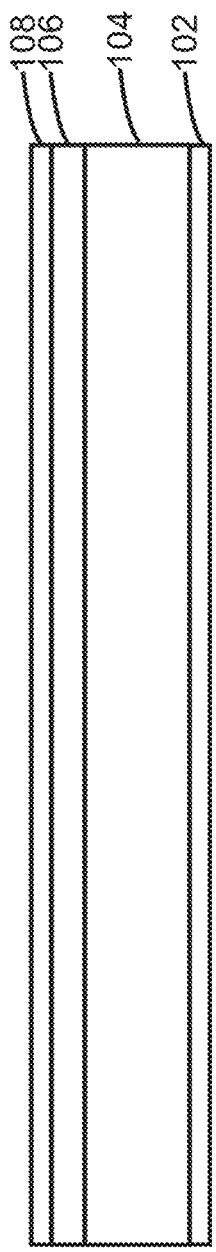
Figure 2F:
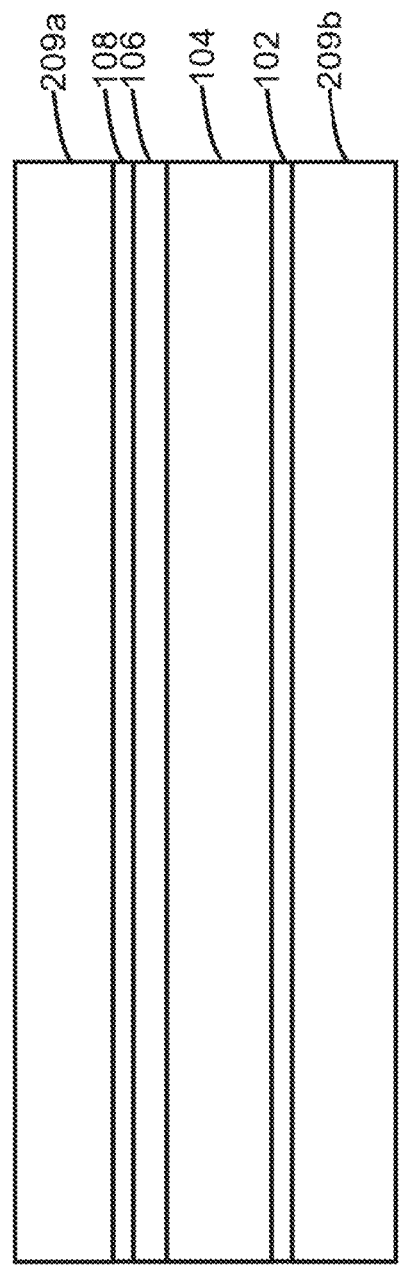
Figure 2G:
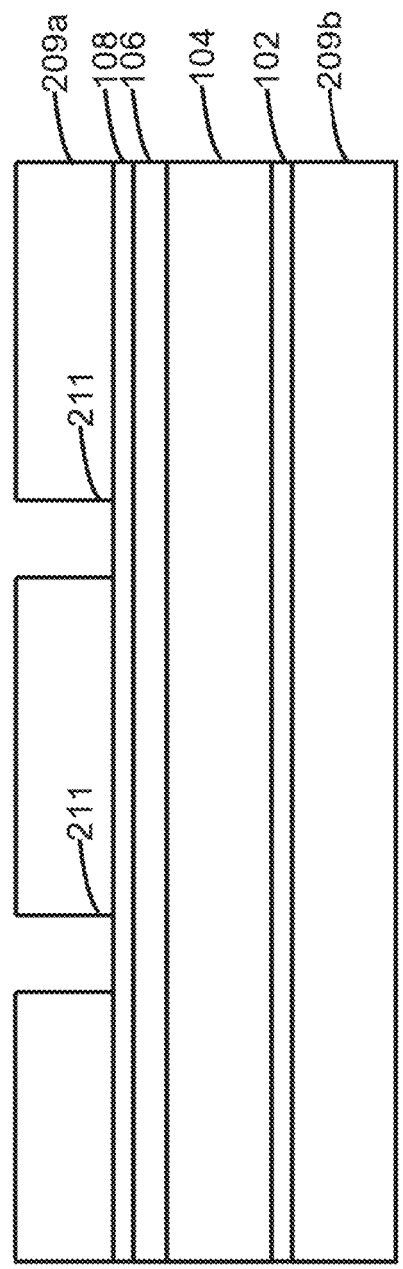
Figure 2H:
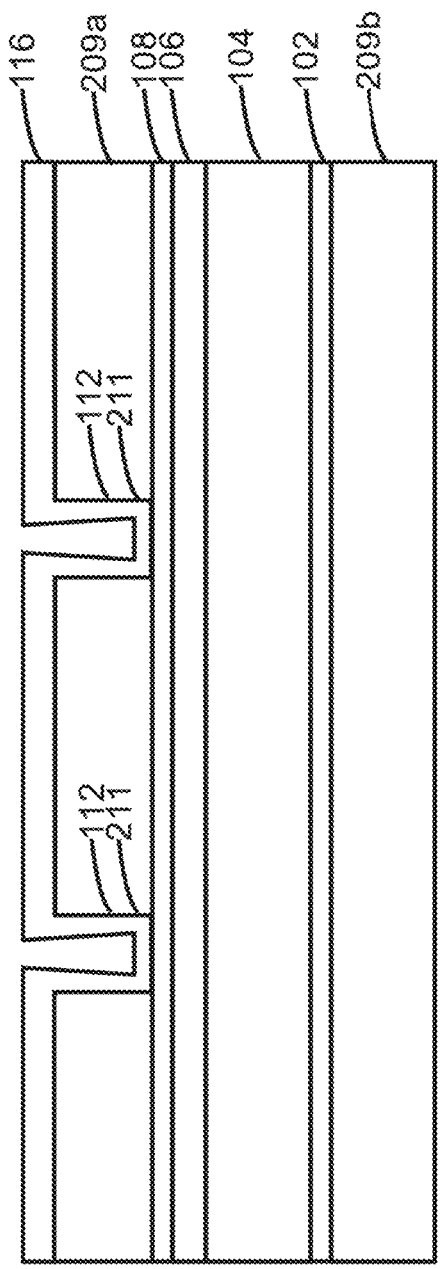
Figure 2I:
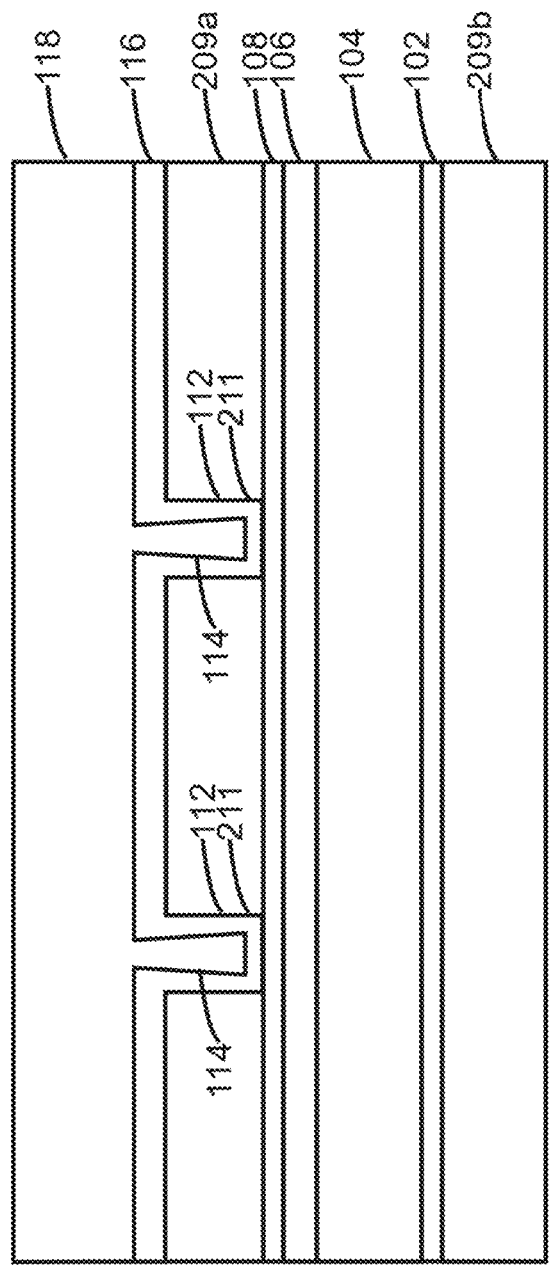
Figure 2J:
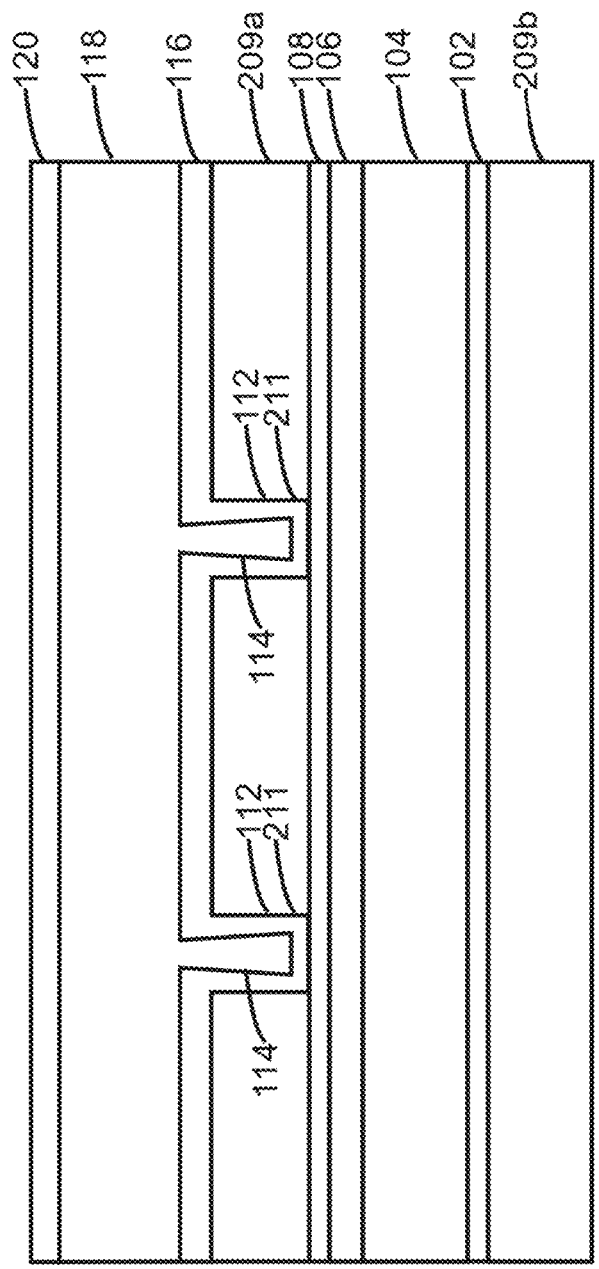
Figure 2K:
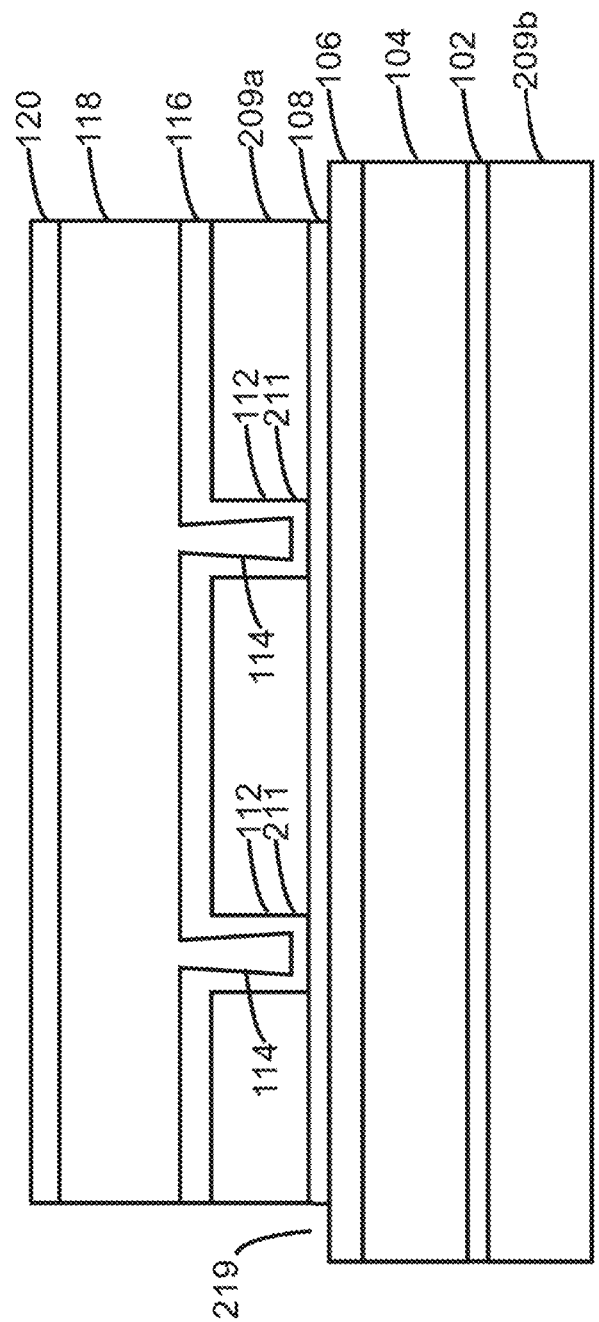
Figure 2L:
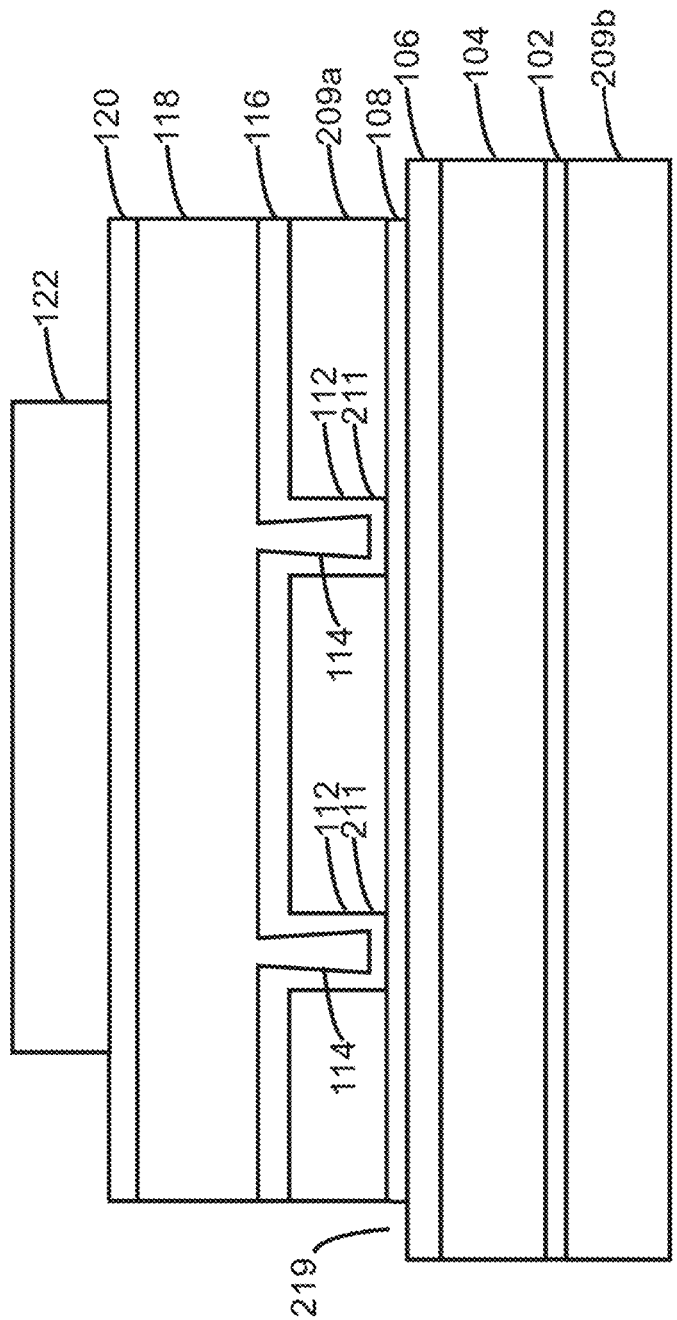
Figure 2M:
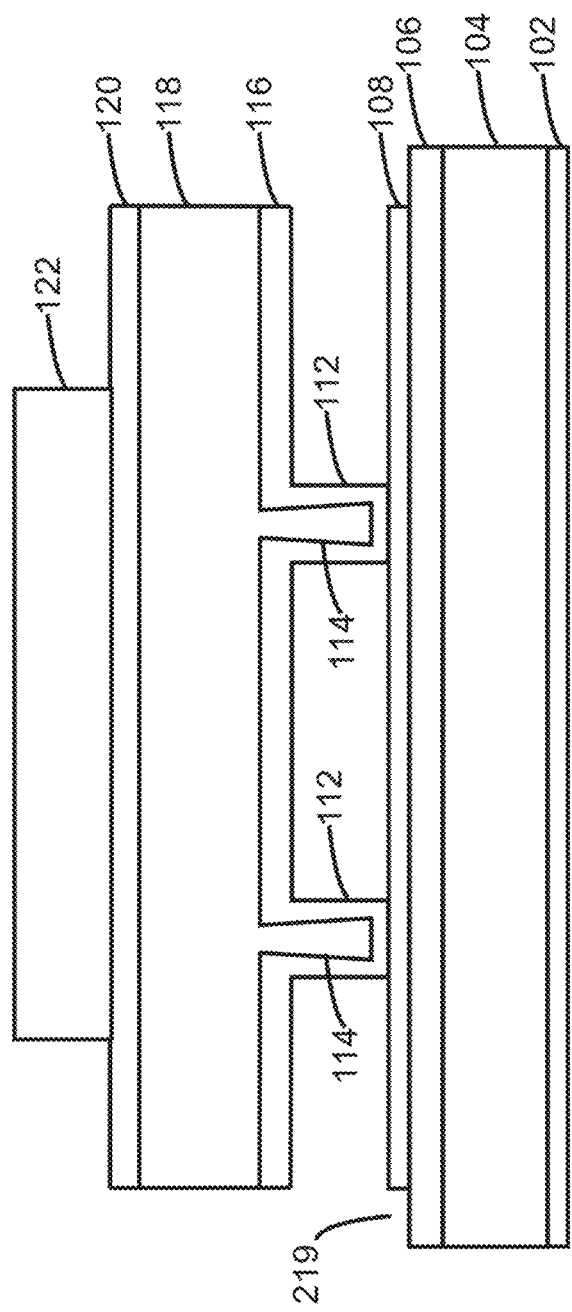
Figure 2N:
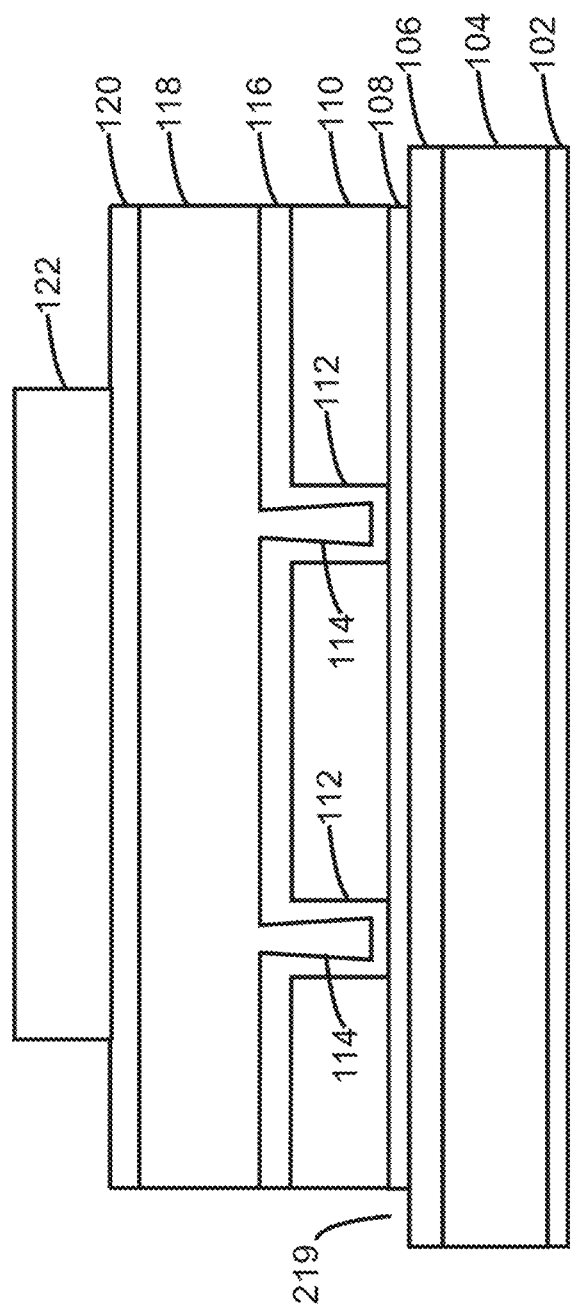

Referring now to FIGS. 2A-2N, a method 200 is described, in accordance with one or more embodiments of the present disclosure. The method may also be referred to as a process of manufacturing an electro-optic modulator. The embodiments and the enabling technologies described previously herein in the context of the electro-optic modulator 100 should be interpreted to extend to the method. It is further noted, however, that the method is not limited to the architecture of the electro-optic modulator. The method 200 is a one-piece fabrication technique in which silicon (Si) or silicon germanium (SiGe) are used as a sacrificial layer on glass substrate plus as a release.

In a step 202, the glass substrate 104 is provided. The glass substrate 104 is disposed on the anti-reflective coating 102.

In a step 204, the transparent electrode 106 is deposited on the glass substrate 104 by sputter deposition.

In a step 206, the alignment layer 108 is deposited on the transparent electrode 106. The alignment layer 108 is deposited on the transparent electrode 106 by chemical vapor deposition (CVD). For example, the alignment layer 108 is deposited on the transparent electrode 106 by plasma-enhanced chemical vapor deposition (PECVD).

The step may also include patterning one or more grooves in the alignment layer 108. The one or more grooves are patterned by etching, plasma-ash, and stripping. For example, the one or more grooves may be patterned by a 248 nm phase-shifting mask (PSM), 193 nm photolithography, or the like.

In a step 208, sacrificial layers 209 are deposited. The sacrificial layers 209 include a sacrificial layer 209a deposited on the alignment layer 108. The sacrificial layers 209 include a sacrificial layer 209b deposited under the antireflective coating 102. The sacrificial layers 209 are deposited by CVD. For example, the sacrificial layers 209 are deposited by PECVD, low pressure chemical vapor deposition (LPCVD), atmospheric pressure chemical vapor deposition (APCVD), or the like. The sacrificial layers 209 may include amorphous silicon (a-Si), polycrystalline silicon (poly-Si), polycrystalline silicon germanium (poly-SiGe), or the like. In some embodiments, the sacrificial layer 209a on the alignment layer 108 is a-Si deposited by PECVD. In some embodiments, the sacrificial layer 209b under the antireflective coating 102 is a poly-Si or poly-SiGe, which is deposited by one of LPCVD, PECVD, or APCVD. It is contemplated that depositing the poly-Si and/or poly-SiGe by LPCVD may warp the glass substrate 104, such that PECVD or APCVD may be desirable.

The step may include patterning one or more grooves (not depicted) in the sacrificial layer 209a disposed on the alignment layer 108. The one or more grooves are patterned by etching, plasma-ash, and stripping. For example, the one or more grooves may be patterned by 193 nm photolithography, or the like. The one or more grooves include a line spacing of 120 nm or smaller. The grooves form nanotrenches in the a-Si.

In a step 210, support structures 211 are patterned in the sacrificial layer 209a disposed on the alignment layer 108. The support structures 211 are patterned by photolithography, plasma-etch, and stripping. Over-etching from the sacrificial layer 209a into the alignment layer 108 is permissible. The support structures 211 provide support when forming the alignment studs 112 and the polymer studs 114. The support structures 211 include the pitch, width, height, and sidewall angle. For example, the support structures 211 include a pitch between adjacent of the support structures 211 of between 10 and 20 um. By way of another example, the support structures 211 include a width of 1.4 um. By way of another example, the support structures 211 include a thickness of between 2 and 5 um. By way of another example, the support structures 211 include a sidewall angle of between 83 and 93 degrees.

In a step 212, the alignment studs 112 and the alignment layer 116 is deposited on the sacrificial layer 209a disposed on the alignment layer 108. For example, the alignment studs 112 are deposited in the support structures 211. The alignment studs 112 and the alignment layer 116 are deposited by chemical vapor deposition (CVD). For example, the alignment studs 112 and the alignment layer 116 are deposited by plasma-enhanced chemical vapor deposition (PECVD). The alignment studs 112 and the alignment layer 116 may include a stress. For example, the alignment studs 112 and the alignment layer 116 may include a tensile stress of between 50 and 150 MPa.

In a step 214, the polymer studs 114 and the polymer layer 118 are spun and cured. For example, the polymer studs 114 are spun into the support structures onto the alignment studs 112. By way of another example, the polymer layer 118 is spun onto the alignment layer 116. The polymer studs 114 and the polymer layer 118 may be cross-linked by exposure to light. The polymer studs 114 and the polymer layer 118 may also be applied with a developer. The developer may remove the portions of the polymer studs 114 and the polymer layer 118 which are not cross-linked. The polymer studs 114 and the polymer layer 118 are cured at a temperature. The polymer studs 114 and the polymer layer 118 are cured at an elevated temperature to reduce shrinkage of the polymer studs 114. The shrinkage of the polymer studs 114 is undesirable as the shrinkage may cause the polymer studs 114 to separate from the alignment studs 112. In some embodiments, the polymer studs 114 and the polymer layer 118 are cured at a temperature between 350 and 400 C. In some embodiments, the polymer studs 114 and the polymer layer 118 are spun as a liquid polyimide which is then hardened during curing.

In a step 216, the dielectric mirror 120 is deposited on the polymer layer 118. The dielectric mirror 120 is deposited on the polymer layer 118 by PECVD or sputter deposition. In some embodiments, the dielectric mirror 120 is deposited on the polymer layer 118 by forming repeating layers of $SiN_x$ and $SiO_2$. In some embodiments, the dielectric mirror 120 is deposited on the polymer layer 118 by forming repeating layers of $ZrO_2$ and $SiO_2$. The dielectric mirror 120 may include a stress. For example, the dielectric mirror 120 may include a tensile stress of between 50 and 150 MPa. In some embodiments, the polymer layer 118 is pretreated with a $CF_4/O_2$ etch to form carbonyl bonds on the polymer layer 118 for improving adhesion of the dielectric mirror 120 to the polymer layer 118.

In a step 218, an active area 219 is patterned from the electro-optic modulator 100. The active array 219 is patterned using photoresist (PR) stripping. The photoresist (PR) stripping is compatible with the polymer layer 118. The active area 219 may also be referred to as a modulation definition. In some embodiments, the active area 219 is patterned based on a critical dimension (CD) of an array to be tested. The active area 219 is patterned through the dielectric mirror 120, the polymer layer 118, the alignment layer 116, the sacrificial layer, the alignment layer 108. In some embodiments, the active area 219 is patterned up to the transparent electrode 106s. In some embodiments, the active area 219 is patterned into the transparent electrode 106. For example, the active area 219 may be patterned into up to 500 Å of the transparent electrode 106.

In a step 220, the hard coat layer 122 is deposited on the dielectric mirror 120. In some embodiments, the hard coat layer 122 is spun and cured on the dielectric mirror 120. The hard coat layer 122 may be cured using a low-temperature (LT) cure to prevent cracking the dielectric mirror 120.

In a step 222, the sacrificial layers are removed. The sacrificial layers may removed by taping, sawing, de-taping, backside etching, and release. In some embodiments, the polymer layer 118 is heavily anchored on the edges to pull the polymer layer 118 tight from tensile stress. Once the sacrificial layers are removed, the electro-optic modulator 100 defines a cavity between the alignment layer 108 and the alignment layer 116. The electro-optic modulator 100 may also define one or more openings. The cavity is accessible through the one or more openings. The one or more openings are defined on the edges of the active area.

In a step 224, the liquid crystal layer 110 is added between the alignment layer 108 and the alignment layer 116. The liquid crystal layer 110 is added through the one or more openings. In some embodiments, the liquid crystal layer 110 is added by vacuum insertion or capillary action. For example, the liquid crystal layer 110 may be added by a capillary action through the cavity. The addition of the liquid crystal layer 110 by the capillary action through the cavity is unlike lamination methods to fabricated NCAP modulators or PDLC modulators. The step may further include sealing the one or more openings with the epoxy seal 115.

Figure 3:
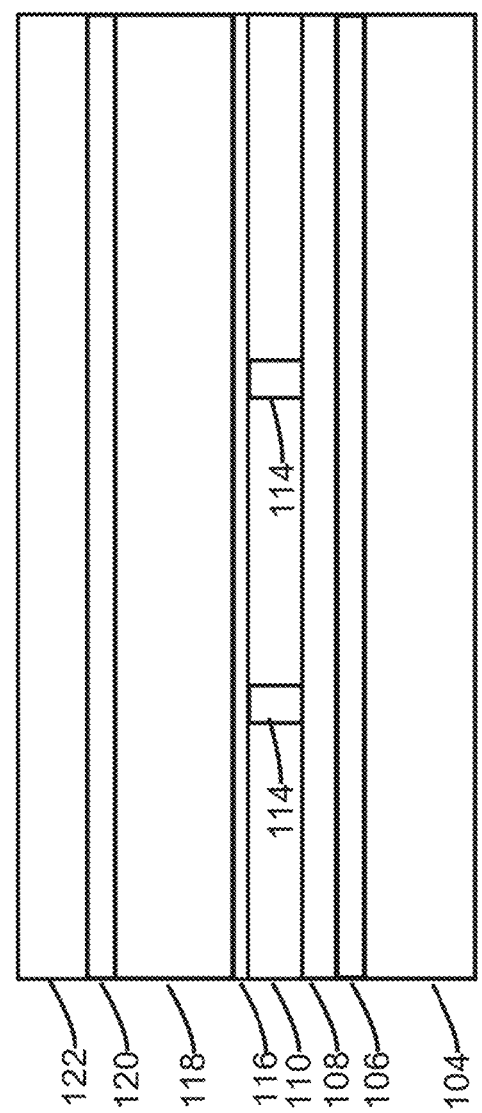
FIG. 3 depicts a cross-section view of an electro-optic modulator, in accordance with one or more embodiments of the present disclosure.
Figure 4A:
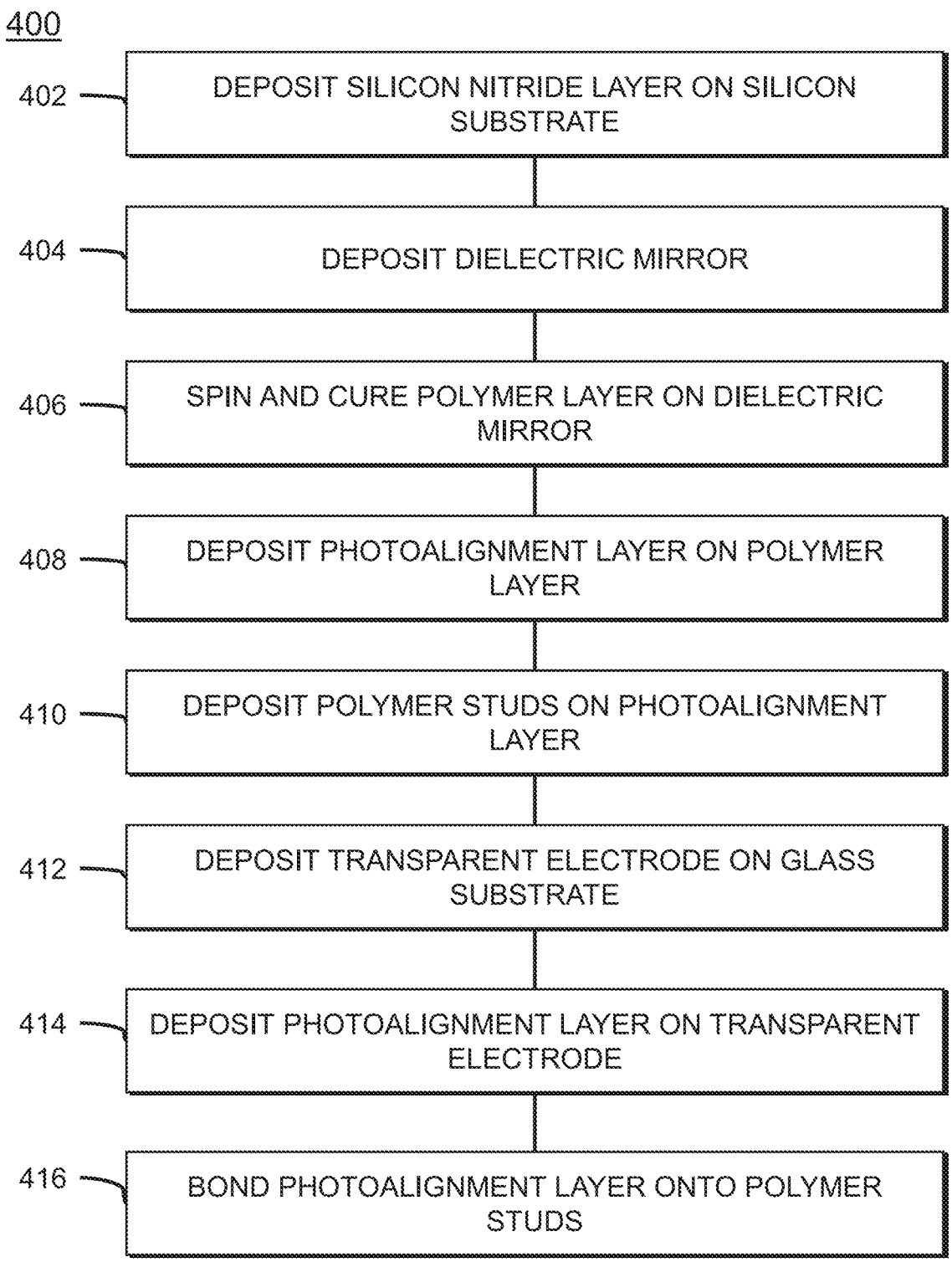
FIGS. 4A-4B depicts a flow diagram of a method for making an electro-optic modulator, in accordance with one or more embodiments of the present disclosure.
Figure 4B:
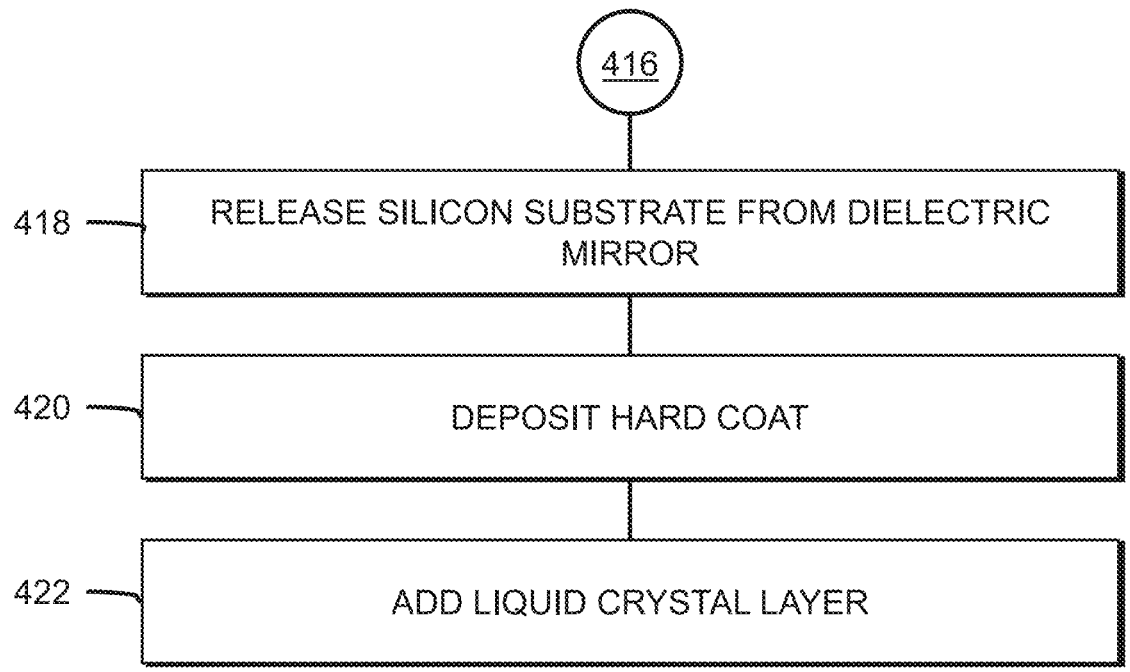
Figure 4C:
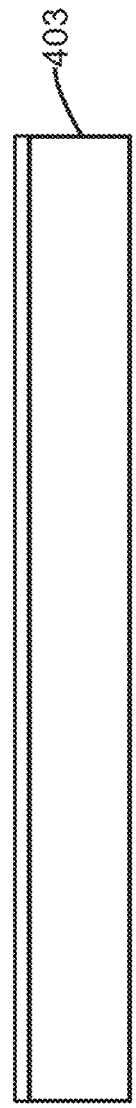
Figure 4D:
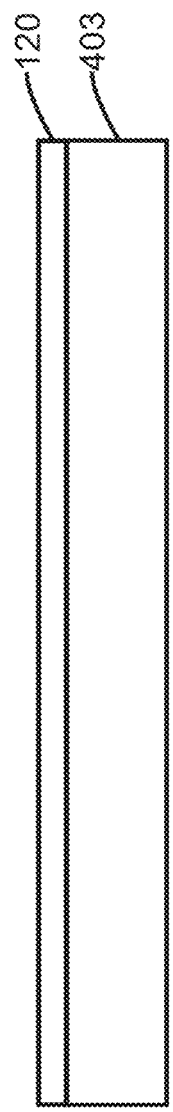
Figure 4E:
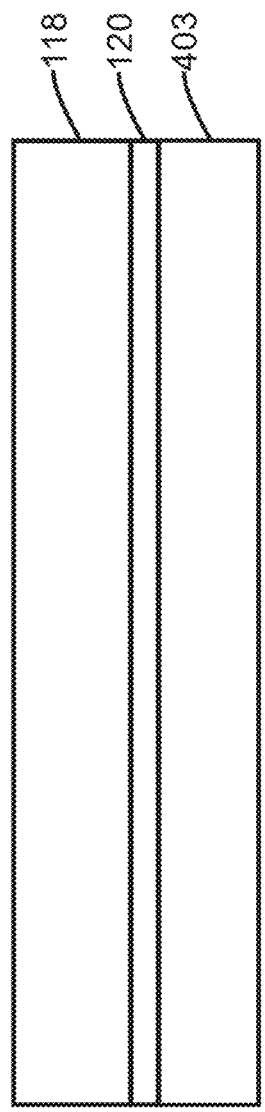
Figure 4G:
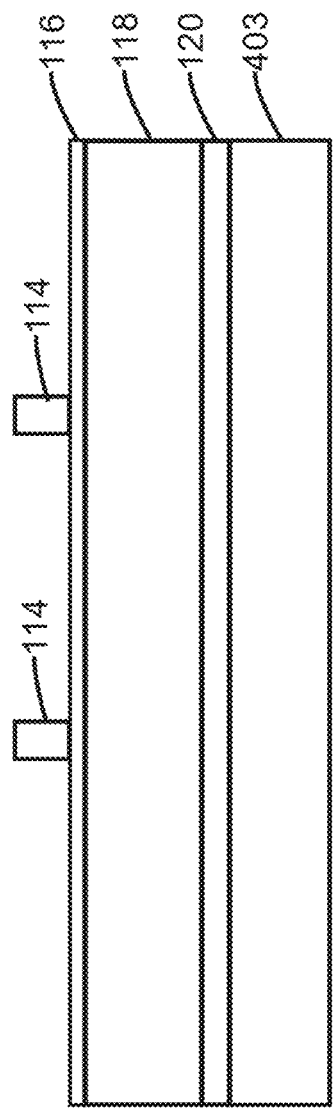
Figure 4H:
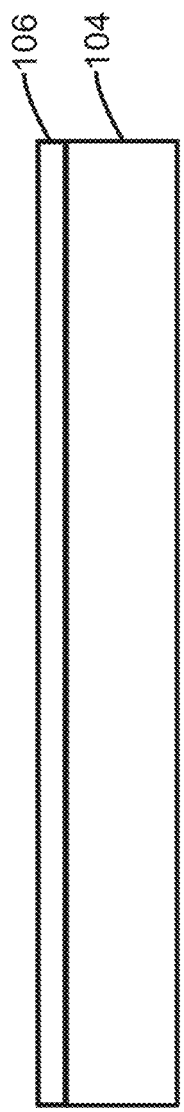
Figure 41:
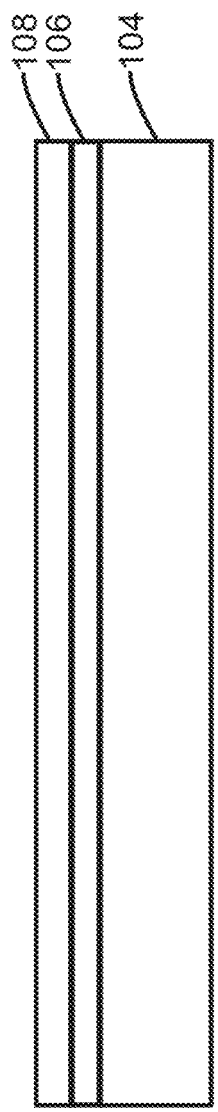
Figure 4J:
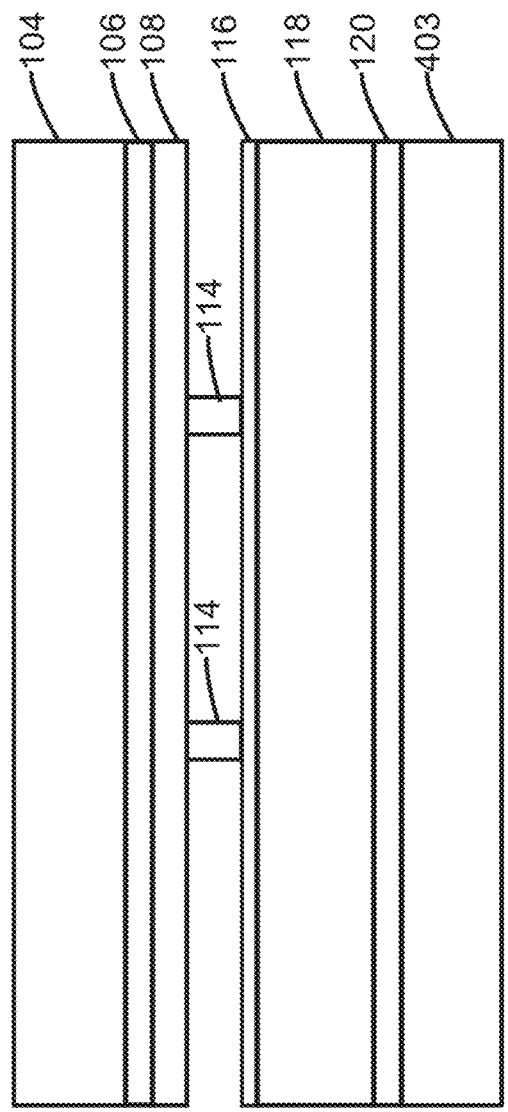
Figure 4K:
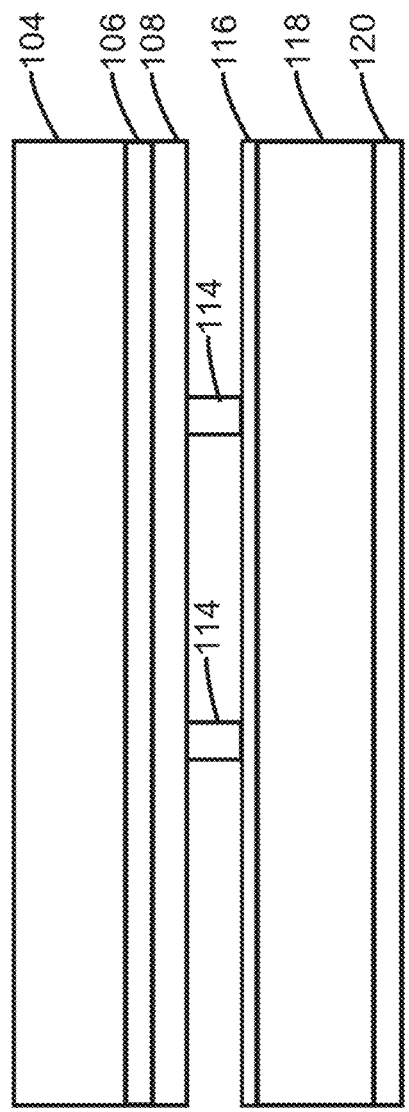
Figure 4L:
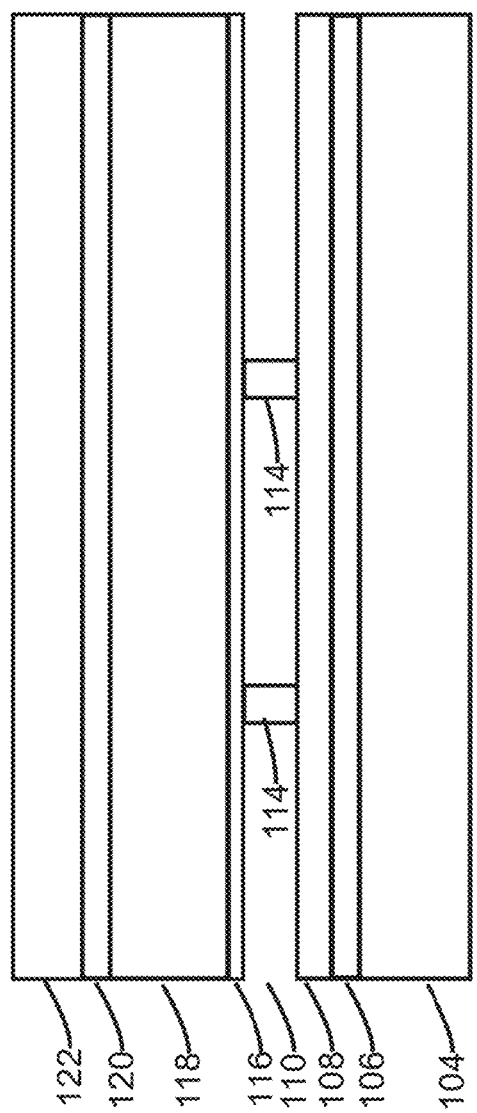
Figure 4M:
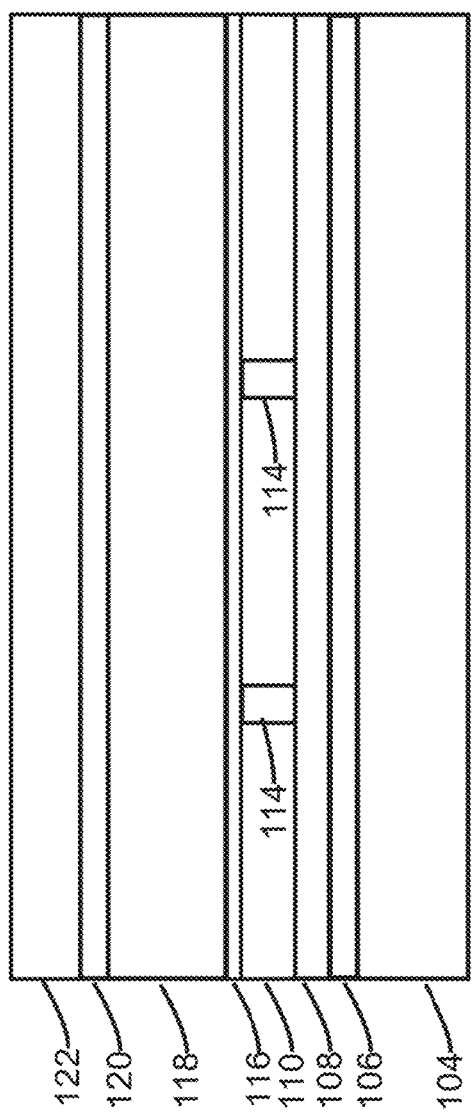

Referring now to FIG. 3, an electro-optic modulator 300 is described, in accordance with one or more embodiments of the present disclosure. The discussion of the electro-optic modulator 100 is incorporated herein by reference in the entirety as to the electro-optic modulator 300.

The electro-optic modulator 300 may include one or more films, layers, or coatings. The one or more film layers selectively permit the transmissivity of light. For example, the electro-optic modulator 300 may include one or more layers, such as, but not limited to, glass substrate 104, transparent electrode 106, alignment layer 108, liquid crystal layer 110, polymer studs 114, epoxy seal 115, alignment layer 116, polymer layer 118, dielectric mirror 120, hard coat layer 122, and the like. The discussion of the glass substrate 104, transparent electrode 106, alignment layer 108, liquid crystal layer 110, polymer studs 114, epoxy seal 115, alignment layer 116, polymer layer 118, dielectric mirror 120, and the hard coat layer 122 of the electro-optic modulator 100 is incorporated herein by reference in the entirety as to the electro-optic modulator 300. The electro-optic modulator 300 is unlike the electro-optic modulator 100, in that the electro-optic modulator 100 includes the alignment studs 112 and the electro-optic modulator 300 does not include the alignment studs 112. The electro-optic modulator 300 is also unlike the electro-optic modulator 100, in that the polymer studs 114 of the electro-optic modulator 100 extend from and are not separated from the polymer layer 118 whereas the polymer studs 114 of the electro-optic modulator 300 are separated from the polymer layer 118 by the alignment layer 116.

In some embodiments, the polymer studs 114 extend from the alignment layer 116. The polymer studs 114 are separated from the polymer layer 118 by the alignment layer 116. Thus, the polymer studs 114 may or may not extend from the polymer layer 118. The polymer studs 114 extend from the alignment layer 116 up to the alignment layer 108. The polymer studs 114 are disposed on the alignment layer 108.

The polymer studs 114 mechanically support the polymer layer 118 by bearing the weight of the polymer layer 118 through the alignment layer 116 and the polymer studs 114 to the alignment layer 108. In this example, the electro-optic modulator 300 does not include the alignment studs 112. In some embodiments, the polymer studs 114 extend through all of the liquid crystal layer 110. For example, the polymer studs 114 extend through the liquid crystal layer 110 up to the alignment layer 108.

Referring now to FIGS. 4A-4M, a method 400 is described, in accordance with one or more embodiments of the present disclosure. The method may also be referred to as a process of manufacturing an electro-optic modulator. The embodiments and the enabling technologies described previously herein in the context of the electro-optic modulator 100, method 200, and electro-optic modulator 300 should be interpreted to extend to the method. It is further noted, however, that the method is not limited to the architecture of the electro-optic modulator 100, method 200, and electro-optic modulator 300. The method 400 is a two-piece fabrication technique with a Si substrate which is released and polymeric flip bonding to glass substrate.

In a step 402, a silicon nitride ($SiN_x$) layer is deposited on a Si substrate 403. The $SiN_x$ layer is deposited by CVD. For example, the $SiN_x$ layer is deposited by 106 by LPCVD. The $SiN_x$ layer has a thickness. For example, the $SiN_x$ layer has a thickness of 1100 Å.

In a step 404, the dielectric mirror 120 is deposited on the $SiN_x$ layer. The dielectric mirror 120 is deposited by PECVD or sputter deposition. The $SiN_x$ layer forms an initial layer of the dielectric mirror 120. The dielectric mirror 120 is deposited by forming repeating layers of $SiN_x$ and $SiO_2$. The dielectric mirror 120 may include a stress. For example, the dielectric mirror 120 may include a tensile stress of between 50 and 150 MPa.

In a step 406, the polymer layer 118 is spun and cured. The polymer layer 118 is spun and cured on the dielectric mirror 120. The polymer layer 118 is cured at a temperature. The polymer layer 118 are cured at an elevated temperature to reduce stress in the dielectric mirror 120 due to shrinkage of the polymer layer 118. In some embodiments, the polymer layer 118 is cured at a temperature between 350 and 400 C. In some embodiments, the polymer layer 118 are spun as a liquid polyimide which is then hardened during curing. The polymer layer 118 may be spun with a thickness between 3.8 and 4.2 um.

In a step 408, the alignment layer 116 is deposited on polymer layer 118. The alignment layer 116 is deposited by CVD. For example, the alignment layer 116 is deposited by PECVD. In some embodiments, the alignment layer 116 is deposited with a thickness. For example, the alignment layer 116 is deposited with a thickness of between 285 and 315 Å.

The step may also include patterning one or more grooves in the alignment layer 116. The one or more grooves are patterned by etching, plasma-ash, and stripping. In some embodiments, the grooves are etched with a depth. For example, the grooves may be etched with a depth of 250 Å. In some embodiments, the grooves define a checkerboard pattern in the alignment layer 116. The alignment layer 116 includes a line spacing (LS). The line spacing is a distance between the grooves. In some embodiments, the line spacing may be 300 nm or smaller. In some embodiments, the line spacing may be 110 nm or smaller.

In a step 410, the polymer studs 114 are deposited on the alignment layer 116. In some embodiments, the polymer studs 114 may be deposited with two masks. In some embodiments, the polymer studs 114 may be deposited with using an alignment with one mask. In some embodiments, the polymer studs 114 are postprocessed with a $O_2/CF_4$ to form carbonyl bonds between the polymer studs 114 and the alignment layer 116 for improving adhesion of the polymer studs 114 to the alignment layer 116.

In a step 412, the transparent electrode 106 is deposited on glass substrate 104 by sputter deposition. In this regard, the glass substrate 104 is not disposed on the antireflective coating 102.

In a step 414, the alignment layer 108 is deposited on the transparent electrode 106. The alignment layer 108 is deposited on the transparent electrode 106 by chemical vapor deposition (CVD). For example, the alignment layer 108 is deposited on the transparent electrode 106 by plasma-enhanced chemical vapor deposition (PECVD). The alignment layer 108 may need a deep ultraviolet (DUV) polarizer mask to align at a desired period.

The steps of depositing the transparent electrode 106 on the glass substrate 104 and depositing the alignment layer 108 may be performed before, simultaneous with, or after the steps of depositing silicon nitride ($SiN_x$) layer on the Si substrate 403, depositing the dielectric mirror 120, spinning and curing the polymer layer 118, and depositing the alignment layer 116 on the polymer layer 118.

In a step 416, the alignment layer 108 is bonded onto the polymer studs 114. The glass substrate 104, the transparent electrode 106, and the alignment layer 108 are flipped and aligned onto the polymer studs 114. The alignment layer 108 is bonded onto the polymer studs 114 by vacuum pressing. The alignment layer 108 is pressed at a glass transition temperature of the polymer studs 114. For example, the polymer studs 114 may include a glass transition temperature of between 150 and 200 C.

In a step 418, the Si substrate is released from the dielectric mirror 120. The Si substrate is released from the dielectric mirror 120 by etching the Si substrate. For example, the Si substrate may be etched by potassium hydroxide (KOH) or the like. The edges of the polymer layer 118 may be clamped during the edges. In some embodiments, the polymer layer 118 need patterning and protective layer on edges depending on the clamps and the etching solution.

In a step 420, the hard coat layer 122 is deposited on the dielectric mirror 120. In some embodiments, the hard coat layer 122 is spun and cured on the dielectric mirror 120. The hard coat layer 122 may be cured using a low-temperature (LT) cure to prevent cracking the dielectric mirror 120.

In a step 422, the liquid crystal layer 110 is added between the alignment layer 108 and the alignment layer 116. The liquid crystal layer 110 is added through the one or more openings. In some embodiments, the liquid crystal layer 110 is added by vacuum or capillary effect insertion. For example, the liquid crystal layer 110 may be added by a capillary action through the cavity. The addition of the liquid crystal layer 110 by the capillary action through the cavity is unlike lamination methods to fabricated NCAP modulators or PDLC modulators and will prevent future damage of LC sensor when top mylar is removed during assembly process. The step may further include sealing the one or more openings with the epoxy seal 115. In some embodiments, edge trim/sealing may be necessary without an upstream delineation etch.

Figure 5:
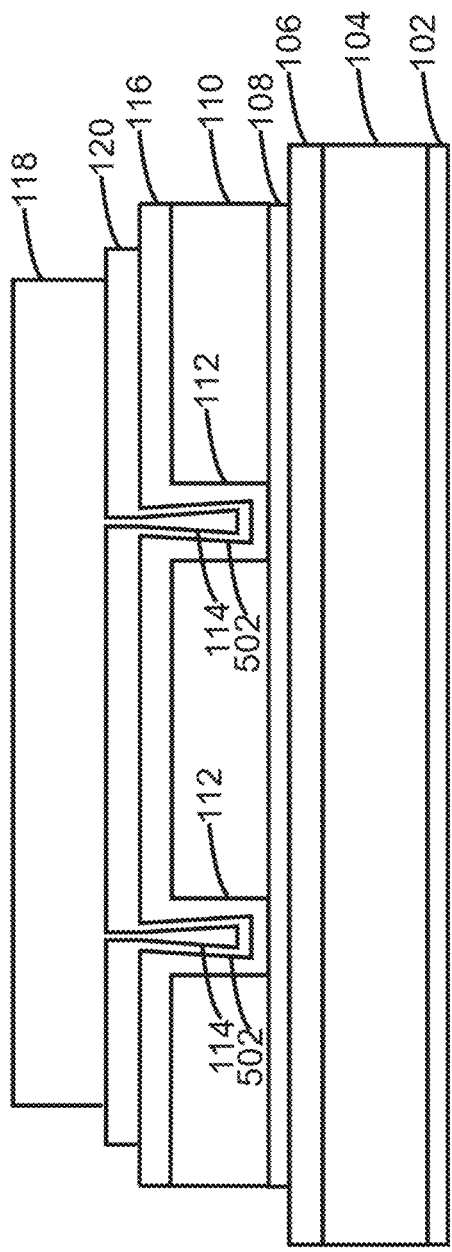
FIG. 5 depicts a cross-section view of an electro-optic modulator, in accordance with one or more embodiments of the present disclosure.

Referring now to FIG. 5, an electro-optic modulator 500 is described, in accordance with one or more embodiments of the present disclosure. The discussion of the electro-optic modulator 100 and the electro-optic modulator 300 is incorporated herein by reference in the entirety as to the electro-optic modulator 500.

The electro-optic modulator 100 may include one or more films, layers, or coatings. The one or more film layers selectively permit the transmissivity of light. For example, the electro-optic modulator 100 may include one or more layers, such as, but not limited to, anti-reflective coating 102, glass substrate 104, transparent electrode 106, alignment layer 108, liquid crystal layer 110, alignment stud 112, polymer studs 114, epoxy seal 115, alignment layer 116, polymer layer 118, dielectric mirror 120, hard coat layer 122, and the like. The discussion of the anti-reflective coating 102, glass substrate 104, transparent electrode 106, alignment layer 108, liquid crystal layer 110, alignment stud 112, polymer studs 114, epoxy seal 115, alignment layer 116, polymer layer 118, dielectric mirror 120, and the hard coat layer 122 of the electro-optic modulator 100 is incorporated herein by reference in the entirety as to the electro-optic modulator 500. The electro-optic modulator 500 also includes dielectric studs 502.

The electro-optic modulator 500 is like the electro-optic modulator 100, with the exception that the electro-optic modulator 500 has the dielectric mirror 120 between the alignment layer 116 and the polymer layer 118. The dielectric mirror 120 is disposed on the alignment layer 116. The polymer layer 118 is disposed on the dielectric mirror 120.

The alignment studs 112 extend from the alignment layer 116 through the liquid crystal layer 110 up to the alignment layer 108. The alignment studs 112 are used as a form to fabricate the dielectric studs 502.

The electro-optic modulator 500 includes the dielectric studs 502. The dielectric studs 502 extend from the dielectric mirror 120. The dielectric studs 502 extend from the dielectric mirror 120 through a first portion of the liquid crystal layer 110. The dielectric studs 502 extend from the dielectric mirror 120 through the first portion of the up to the alignment studs 112. The dielectric studs 502 are disposed on the alignment studs 112. The alignment studs 112 separate the dielectric studs 502 and the liquid crystal layer 110. The alignment studs 112 also separate the dielectric studs 502 and the alignment layer 108. The dielectric studs 502 are used as a form to fabricate the polymer studs 114.

The electro-optic modulator 500 includes the polymer studs 114. The polymer studs 114 extend from the polymer layer 118. The polymer studs 114 extend from the polymer layer 118 through the dielectric mirror 120 and the alignment layer 116. The polymer studs 114 extend from the polymer layer 118 through the dielectric mirror 120 and the alignment layer 116 through a second portion of the liquid crystal layer 110 up to the dielectric studs 502. The second portion of the liquid crystal layer 110 is less than the first portion of the liquid crystal layer 110. In this regard, the dielectric studs 502 extend further into the liquid crystal layer 110 than the polymer studs 114. The polymer studs 114 are disposed on the dielectric studs 502. The dielectric studs 502 separate the alignment studs 112 and the polymer studs 114.

The electro-optic modulator 500 may be fabricated by a similar process to the method 200. Although the method 200 is described as including spinning and curing the polymer studs 114 and the polymer layer 118 followed by depositing the dielectric mirror 120, this is not intended as a limitation of the present disclosure. In some embodiments, the dielectric mirror 120 may be deposited before spinning and curing the polymer studs 114 and the polymer layer 118. The dielectric mirror 120 may then include dielectric studs 502 disposed in the support structure on the alignment studs 112. The polymer layer 118 may then be deposited on the dielectric mirror 120 and the polymer studs 114 may then be deposited in the support structure on the dielectric studs 502. The steps in this method may be considered a mirror-first process, as opposed to a polymer layer-first process. In some embodiments, the mirror-first process may use a photo-definable polymer layer 118.

Figure 6:
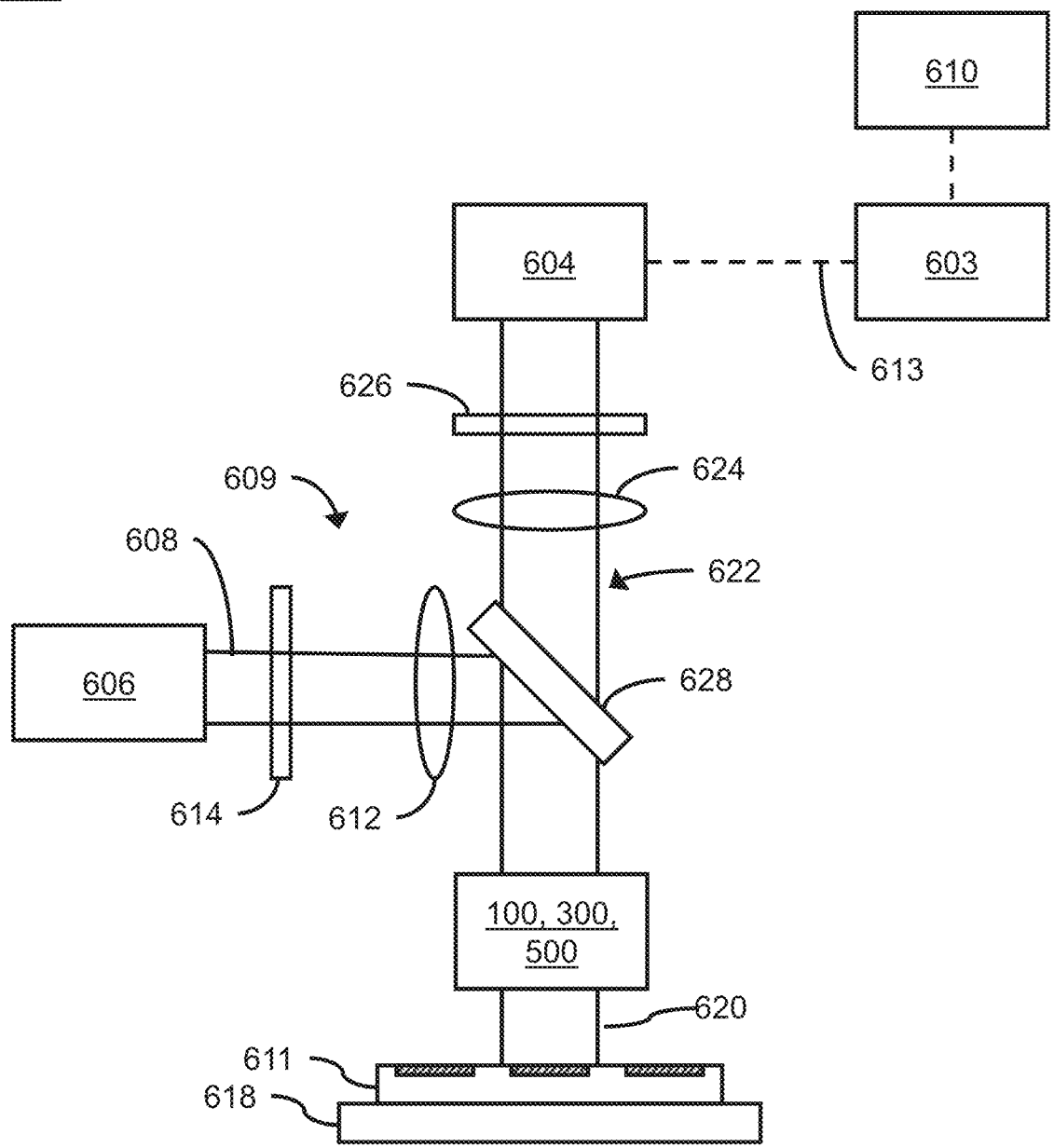
FIG. 6 depicts a simplified view of an imaging system, in accordance with one or more embodiments of the present disclosure.

FIG. 6 is a conceptual view illustrating an imaging system 600, in accordance with one or more embodiments of the present disclosure. For the purposes of the present disclosure, the term 'imaging system' is interchangeable with the term 'imaging tool.' The imaging system 600 may also be referred to as an automated optical inspection (AOI) system, a voltage imaging optical system (VIOS), an array checker, and the like.

The imaging system 600 may generally include any type of imaging tool suitable, such as, but not limited to, voltage imaging. Voltage imaging may be employed to detect and measure defects in flat panel thin film transistors (TFT) arrays. The performance of the TFT array is simulated as if it were assembled into a TFT cell and then the characteristics of the TFT array are measured by indirectly measuring actual voltage distribution on the panel, or so-called voltage imaging, using an electro-optic modulator (100, 300, 500). The voltage imaging may be performed by the imaging system 600. The imaging system 600 may include one or more components for checking such TFT arrays or other samples.

The electro-optic modulator (100, 300, 500). may be advantageous for a number of imaging tasks, such as to modulate a light source of the imaging system 600 to assist in detecting one or more defects of a sample 611, such as, but not limited to, thin film transistor (TFT) arrays, liquid crystal display (LCD) panels, OLED panels, and the like. The TFT arrays may be formed on a substrate, such as a clear plate of thin glass. The TFT arrays may include one or more printed layers. The printed layers may be formed on the substrate by a number of processes, such as, but not limited to, one or more material deposition steps, one or more lithography steps, one or more etching steps, and the like. The fabrication may occur in stages, where a material (e.g., indium tin oxide (ITO), etc.) is deposited over a previous layer or on the glass substrate, according to a process pattern. During fabrication, the printed layers are fabricated within selected tolerances to properly construct the final device. The printed layers may exhibit defects which are outside of the selected tolerances. Characteristics of the TFT array may be measured by the imaging system 600 to detect the defects.

In embodiments, the imaging system 600 includes an illumination source 606 to generate illumination 608. The illumination 608 may include one or more selected wavelengths of light including, but not limited to, vacuum ultraviolet radiation (VUV), deep ultraviolet radiation (DUV), ultraviolet (UV) radiation, visible radiation, or infrared (IR) radiation. The illumination source 606 may further generate illumination 608 including any range of selected wavelengths. In embodiments, the illumination source 606 may include a spectrally-tunable illumination source to generate illumination 608 having a tunable spectrum.

In embodiments, the illumination source 606 directs the illumination 608 to a sample 611 via an illumination pathway 609. The illumination pathway 609 may include one or more lenses 612 or additional illumination optical components 614 suitable for modifying and/or conditioning the illumination 608. For example, the one or more illumination optical components 614 may include, but are not limited to, one or more polarizers, one or more filters, one or more beam splitters, one or more diffusers, one or more homogenizers, one or more apodizers, one or more shapers, one or more shutters (e.g., mechanical shutters, electro-optical shutters, acousto-optical shutters, or the like), one or more aperture stops, and/or one or more field stops.

In embodiments, the imaging system 600 includes the electro-optic modulator 100. The electro-optic modulator (100, 300, 500) is disposed in a path of the illumination 608 from the illumination source 606. The electro-optic modulator (100, 300, 500) may modulate one or more characteristics of the illumination 608. During operation, light transmits through portions of the electro-optical modulator (100, 300, 500), and defects can be detected by observing changes in the reflected or transmitted light. The electro-optic modulator (100, 300, 500) is separated from the sample 611 by an air gap. The electro-optic modulator (100, 300, 500) may be placed a select number of microns (e.g., between 5-75 microns) above the surface of the sample 611 (e.g., the TFT array), and a voltage bias is applied across a transparent electrode of a layer of indium tin oxide (hereinafter "ITO") on a surface of the electro-optic modulator (100, 300, 500). Thereupon, the electro-optic modulator (100, 300, 500) capacitively couples to the sample 611 so that an electric field associated with the sample 611 is sensed by one or more layers of the electro-optic modulator (100, 300, 500) (e.g., a layer including liquid crystals). The intensity of incident light transmitted through the liquid crystals of the electro-optic modulator are varied, (i.e., modulated), based on the electric field strength felt by the liquid crystals. For example, in areas where a normal pixel is located, a localized voltage potential is impressed (e.g., a capacitive coupling between the sample 611 and the electro-optic modulator (100, 300, 500)) causing one or more films of the electro-optical modulator 100 to be locally translucent. In the locally translucent regions, light from the light source 606 is allowed to pass through the electro-optical modulator (100, 300, 500) and reflect from the sample 611, for passing through to a collection pathway 622 (e.g., for capture by detector 604). By way of another example, in areas where no voltage potential is impressed (e.g., no capacitive coupling), one or more films of the electro-optical modulator (100, 300, 500) remains locally opaque. In the case where the electro-optical modulator (100, 300, 500) is locally opaque, light from light source 606 is scattered or otherwise prevented from passing through to the sample 611. Thus, a transmission-voltage (T-V) curve may be determined by applying the voltage. The intrinsic switching voltage of the electro-optic modulator 100 may correspond to the voltage across the electro-optic modulator (100, 300, 500) at which light transmission through the electro-optic modulator (100, 300, 500) has a maximum sensitivity to a change in voltage. For example, the switching voltage may correspond to the electric field strength at which a given percentage of liquid crystal molecules are substantially aligned with the electric field allowing for the light transmission.

In embodiments, the sample 611 includes a thin-film transistor (TFT) array. For example, the sample 611 may include pixel elements disposed between inactive regions. The sample stage 618 may include any device suitable for positioning the sample 611 within the imaging system 600.

In embodiments, a detector 604 is configured to capture radiation emanating from the sample 611 (e.g., sample light 620) through a collection pathway 622. For example, the collection pathway 622 may include, but is not required to include, the electro-optic modulator (100, 300, 500), a collection lens (e.g., an objective lens), or one or more additional collection pathway lenses 624. In this regard, a detector 604 may receive radiation reflected or scattered (e.g., via specular reflection, diffuse reflection, and the like) from the sample 611 or generated by the sample 611 (e.g., luminescence associated with absorption of the illumination 608, or the like).

The system 600 may include, but is not limited to, a controller 603. The controller 603 may include one or more processors and memory, and may include or be coupled to a user interface 610.

The collection pathway 622 may further include any number of collection optical components 626 to direct and/or modify illumination collected by the electro-optic modulator (100, 300, 500) including, but not limited to one or more collection pathway lenses 624, one or more filters, one or more polarizers, or one or more blocks. Additionally, the collection pathway 622 may include field stops to control the spatial extent of the sample imaged onto the detector 604 or aperture stops to control the angular extent of illumination from the sample used to generate an image on the detector 604. In another embodiment, the collection pathway 622 includes an aperture stop located in a plane conjugate to the back focal plane of an optical element to provide telecentric imaging of the sample. In embodiments, the imaging system 600 includes a beam splitter 628 oriented such that the electro-optic modulator 100 may simultaneously direct the illumination 608 to the sample 611 and collect radiation emanating from the sample 611.

The detector 604 may include any type of optical detector suitable for measuring illumination received from the sample 611. For example, the detector 604 may include, but is not limited to, a CCD detector, a TDI detector, a photo-multiplier tube (PMT), an avalanche photodiode (APD), a complementary metal-oxide-semiconductor (CMOS) sensor, or the like. In another embodiment, the detector 604 may include a spectroscopic detector suitable for identifying wavelengths of light emanating from the sample 611.

In embodiments, the controller 603 is communicatively coupled to a detector 604. The controller 603 may include one or more processors configured to execute any of various process steps. In embodiments, the controller 603 is configured to generate and provide one or more control signals configured to perform one or more adjustments to one or more process tools based on image signals 613 from the detector 604.

The one or more processors of the controller 603 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). In one embodiment, the one or more processors may be embodied as a desktop computer, mainframe computer system, workstation, image computer, parallel processor, networked computer, or any other computer system configured to execute a program configured to operate or operate in conjunction with the imaging system 600, as described throughout the present disclosure. Moreover, different subsystems of the system 600 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 603 may include one or more controllers housed in a common housing or within multiple housings. In this way, any controller or combination of controllers may be separately packaged as a module suitable for integration into imaging system 600. Further, the controller 603 may analyze data received from the detector 604 and feed the data to additional components within the imaging system 600 or external to the imaging system 600.

The memory medium may include any storage medium known in the art suitable for storing program instructions executable by the associated one or more processors. For example, the memory medium may include a non-transitory memory medium. By way of another example, the memory medium may include, but is not limited to, a read-only memory (ROM), a random-access memory (RAM), a magnetic or optical memory device (e.g., disk), a magnetic tape, a solid-state drive and the like. It is further noted that memory medium may be housed in a common controller housing with the one or more processors. In one embodiment, the memory medium may be located remotely with respect to the physical location of the one or more processors and controller. For instance, the one or more processors of controller 603 may access a remote memory (e.g., server), accessible through a network (e.g., internet, intranet and the like).

In embodiments, the user interface 610 is communicatively coupled to the controller 603. In embodiments, the user interface 610 may include, but is not limited to, one or more desktops, laptops, tablets, and the like. In embodiments, the user interface 610 includes a display used to display data of the system 600 to a user. The display of the user interface 610 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 610 is suitable for implementation in the present disclosure. In embodiments, a user may input selections and/or instructions responsive to data displayed to the user via a user input device of the user interface 610.

Referring generally again to FIGS. 1A-6. It is contemplated that the electro-optic modulator (100, 300, 500) provides several benefits of NCAP based EO modulators. The electro-optic modulator (100, 300, 500) improves noise, dynamic range, and defectivity sensitivity as well as lower threshold fields of modulator product to detect defects during flat panel manufacturing. The electro-optic modulator (100, 300, 500) achieves a desired level of flatness. The electro-optic modulator (100, 300, 500) reduces part-to-part variation stemming from mechanical fabrication procedures. The electro-optic modulator (100, 300, 500) includes improved defect detection sensitivity and reduced threshold fields required for defect metrology during fabrication of flat-panel displays.

In some embodiments, the electro-optic modulator (100, 300, 500) may include an area. For example, the electro-optic modulator (100, 300, 500) may include an area of 130 mm by 130 mm up to an area of 1 cm by 1 cm.

As used throughout the present disclosure, the term "sample" generally refers to a substrate formed of a semiconductor or non-semiconductor material (e.g., thin filmed glass, or the like). For example, a semiconductor or non-semiconductor material may include, but is not limited to, monocrystalline silicon, gallium arsenide, indium phosphide, or a glass material. A sample may include one or more layers. For example, such layers may include, but are not limited to, a resist (including a photoresist), a dielectric material, a conductive material, and a semiconductive material. Many different types of such layers are known in the art, and the term sample as used herein is intended to encompass a sample on which all types of such layers may be formed. One or more layers formed on a sample may be patterned or un-patterned. For example, a sample may include a plurality of dies, each having repeatable patterned features. Formation and processing of such layers of material may ultimately result in completed devices. Many different types of devices may be formed on a sample, and the term sample as used herein is intended to encompass a sample on which any type of device known in the art is being fabricated. Further, for the purposes of the present disclosure, the term sample and wafer should be interpreted as interchangeable. In addition, for the purposes of the present disclosure, the terms patterning device, mask and reticle should be interpreted as interchangeable.

It is further contemplated that each of the embodiments of the methods described above may include any other step(s) of any other method(s) described herein. In addition, each of the embodiments of the method described above may be performed by any of the systems described herein. In some embodiments, the methods utilize Surface Micro-electromechanical systems ("Surface MEMS") fabrication techniques available at silicon foundries to produce the electro-optic modulator 100.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An electro-optic modulator comprising:
 a glass substrate;
 a transparent electrode disposed on the glass substrate;
 a first alignment layer disposed on the transparent electrode;
 a liquid crystal layer disposed on the first alignment layer;
 a second alignment layer disposed on the liquid crystal layer;
 a polymer layer disposed on the second alignment layer;
 a plurality of polymer studs; wherein the plurality of polymer studs extend through at least a portion of the liquid crystal layer; wherein the plurality of polymer studs mechanically support the polymer layer;
 a dielectric mirror disposed on the polymer layer; and
 a hard coat layer disposed on the dielectric mirror.

2. The electro-optic modulator of claim 1, wherein the liquid crystal layer includes a thickness of between 2 and 5 micrometers.

3. The electro-optic modulator of claim 1, wherein the liquid crystal layer is not a nematic curvilinear aligned phases or a polymer dispersed liquid crystal.

4. The electro-optic modulator of claim 1, wherein the plurality of polymer studs extend from the polymer layer through the second alignment layer and at least the portion of the liquid crystal layer.

5. The electro-optic modulator of claim 4, comprising a plurality of alignment studs; wherein the plurality of alignment studs extend from the second alignment layer up to the first alignment layer; wherein the plurality of polymer studs extend through at least the portion of the liquid crystal layer up to the alignment studs; wherein the plurality of polymer studs are disposed on the plurality of alignment studs.

6. The electro-optic modulator of claim 5, comprising an anti-reflective coating; wherein the glass substrate is disposed on the anti-reflective coating.

7. The electro-optic modulator of claim 1, wherein the plurality of polymer studs extend from the second alignment layer through the liquid crystal layer up to the first alignment layer; wherein the plurality of polymer studs are separated from the polymer layer by the second alignment layer.

8. The electro-optic modulator of claim 1, wherein the plurality of polymer studs each include a width of less than 1.4 micrometers and a thickness of between 2 and 5 micrometers.

9. The electro-optic modulator of claim 8, wherein the plurality of polymer studs each include a sidewall angle of between 83 and 93 degrees.

10. The electro-optic modulator of claim 1, wherein the transparent electrode comprises at least one of indium tin oxide (ITO) or silver nanowire.

11. The electro-optic modulator of claim 1, wherein the first alignment layer and the second alignment layer each comprise at least one of silicon oxynitride or silicon dioxide.

12. The electro-optic modulator of claim 1, wherein the first alignment layer and the second alignment layer each include a refractive index between 1.51 and 1.55.

13. The electro-optic modulator of claim 1, wherein the polymer layer and the plurality of polymer studs each comprise a crosslinked polymer.

14. The electro-optic modulator of claim 1, wherein the dielectric mirror has greater than 80% reflectance for light with a wavelength between 570 to 670 nm.

15. The electro-optic modulator of claim 1, wherein the dielectric mirror is a stack of repeating layers of silicon nitride and silicon dioxide.

16. The electro-optic modulator of claim 1, wherein the dielectric mirror is a stack of repeating layers of zirconium oxide and silicon dioxide.

17. The electro-optic modulator of claim 1, comprising an epoxy seal; wherein the epoxy seal seals the liquid crystal layer between the first alignment layer and the second alignment layer.

18. An imaging system comprising:
 an illumination source configured to generate illumination;
 a stage for a sample;
 a detector to generate an image of at least a portion of the sample; and
 an electro-optic modulator disposed in a path of the illumination from the illumination source and separated from the sample by an air gap, wherein the electro-optic modulator comprises:
  a glass substrate;
  a transparent electrode disposed on the glass substrate;
  a first alignment layer disposed on the transparent electrode;
  a liquid crystal layer disposed on the first alignment layer;
  a second alignment layer disposed on the liquid crystal layer;
  a polymer layer disposed on the second alignment layer;
  a plurality of polymer studs; wherein the plurality of polymer studs extend through at least a portion of the liquid crystal layer; wherein the plurality of polymer studs mechanically support the polymer layer;
  a dielectric mirror disposed on the polymer layer; and
  a hard coat layer disposed on the dielectric mirror.

19. An electro-optic modulator comprising:
 a glass substrate;
 a transparent electrode disposed on the glass substrate;
 a first alignment layer disposed on the transparent electrode;
 a liquid crystal layer disposed on the first alignment layer;
 a second alignment layer disposed on the liquid crystal layer;
 a plurality of alignment studs; wherein the plurality of alignment studs extend from the second alignment layer through the liquid crystal layer up to the first alignment layer;
 a dielectric mirror disposed on the second alignment layer;
 a plurality of dielectric studs; wherein the plurality of dielectric studs extend from the dielectric mirror through a first portion of the liquid crystal layer up to the plurality of alignment studs; wherein the plurality of dielectric studs are disposed on the plurality of alignment studs;
 a polymer layer disposed on the dielectric mirror; and a plurality of polymer studs; wherein the plurality of polymer studs extend from the polymer layer through the dielectric mirror, the second alignment layer, and a second portion of the liquid crystal layer up to the plurality of dielectric studs; wherein the plurality of polymer studs are disposed on the plurality of dielectric studs.

20. The electro-optic modulator of claim 19, wherein the liquid crystal layer includes a thickness of between 2 and 5 micrometers.

21. The electro-optic modulator of claim 19, wherein the liquid crystal layer is not a nematic curvilinear aligned phases or a polymer dispersed liquid crystal.

* * * * *